(12) United States Patent
Nydam

(10) Patent No.: US 10,088,009 B2
(45) Date of Patent: Oct. 2, 2018

(54) VEHICLE VIBRATION DAMPENING MOUNT ASSEMBLY

(71) Applicant: Nissan North America, Inc., Franklin, TN (US)

(72) Inventor: Scott Nydam, Farmington Hills, MI (US)

(73) Assignee: Nissan North America, Inc., Frankln, TN (US)

( * ) Notice: Subject to any disclaimer, the term of this patent is extended or adjusted under 35 U.S.C. 154(b) by 0 days.

(21) Appl. No.: 15/388,622

(22) Filed: Dec. 22, 2016

(65) Prior Publication Data

US 2018/0180135 A1    Jun. 28, 2018

(51) Int. Cl.
*F16F 13/10*  (2006.01)
*B62D 24/04*  (2006.01)
*B62D 33/06*  (2006.01)

(52) U.S. Cl.
CPC .............. *F16F 13/10* (2013.01); *B62D 24/04* (2013.01); *B62D 33/0604* (2013.01)

(58) Field of Classification Search
CPC ...... F16F 13/10; B62D 24/04; B62D 33/0604
USPC .................................... 267/140.13, 292, 293
See application file for complete search history.

(56) References Cited

U.S. PATENT DOCUMENTS

| | | | | |
|---|---|---|---|---|
| 4,759,534 A | * | 7/1988 | Hartel | F16F 13/30 188/267.1 |
| 4,893,800 A | * | 1/1990 | Tabata | C10M 171/001 180/292 |
| 4,913,409 A | * | 4/1990 | Doi | F16F 13/30 267/140.13 |
| 5,249,784 A | * | 10/1993 | Murakami | F16F 9/532 188/267.1 |
| 5,944,152 A | * | 8/1999 | Lindsay | F16F 9/532 188/293 |
| 7,506,862 B2 | * | 3/2009 | Siemer | B60G 7/02 267/141 |
| 8,091,871 B2 | | 1/2012 | Bradshaw et al. | |
| 9,097,310 B2 | * | 8/2015 | Gaspar | F16F 13/1463 |
| 9,163,695 B2 | * | 10/2015 | Saito | F16F 13/1463 |
| 9,765,845 B2 | * | 9/2017 | Bradshaw | F16F 13/16 |
| 2014/0339035 A1 | | 11/2014 | Breida et al. | |

* cited by examiner

*Primary Examiner* — Thomas J Williams
*Assistant Examiner* — Mariano Sy

(57) ABSTRACT

A vibration dampening mount assembly includes a housing, resilient material, a sleeve and a restricting structure. The resilient material is fixedly attached to an interior surface of the housing and defines a first chamber and a second chamber. The sleeve is disposed within the housing and is centrally attached to the resilient material. The restricting structure between the first chamber and the second chamber includes a first portion attached to the housing and a second portion attached to the sleeve. In response to movement of the sleeve relative to the housing, the second portion of the restricting structure moves relative to the first portion. The first portion and the second portion of the restricting structure define a fluid passageway therebetween. The cross-sectional area of the fluid passageway changes in response to movement of the second portion relative to the first portion.

19 Claims, 16 Drawing Sheets

US 10,088,009 B2

VEHICLE VIBRATION DAMPENING MOUNT ASSEMBLY

BACKGROUND

Field of the Invention

The present invention generally relates to a vehicle vibration dampening mount assembly. More specifically, the present invention relates to a vehicle vibration dampening mount assembly that includes hydraulic chambers in fluid communication with one another configured to dampen vibration.

Background Information

Motorized vehicles experience vibrations as they operate and include mount structures that are designed to absorb at least some of the vibration. Some mount structures include an elastic member that makes use of resilient properties of an elastic material to absorb some vibrations. Other mount structures include hydraulic fluid passing between two hydraulic chambers to dampen vibrations.

SUMMARY

One object of the present disclosure is to provide a vibration dampening mount assembly with a plurality of fluid filed chambers in fluid communication with one another via a passageway where the size of passageway varies in response to vibration related displacement conditions of the vibration dampening mount assembly, such that the changes in the size of the passageway alters flow rate of fluid moving between the fluid filled chambers.

In view of the state of the known technology, one aspect of the present disclosure is to provide a vibration dampening mount assembly with a housing, a resilient material, a sleeve and a restricting structure. The housing has interior surface, a first end and a second end. The resilient material has an outer portion fixedly attached to the interior surface of the housing and at least partially defining a first chamber and a second chamber within the housing. The sleeve is disposed within the housing and is fixedly attached to a central portion of the resilient material. The sleeve extends from proximate the first end to the second end of the housing. The restricting structure is disposed between the first chamber and the second chamber within the housing. A first portion of the restricting structure is attached to the housing and a second portion of the restricting structure is attached to the sleeve. In response to movement of the sleeve relative to the housing, the second portion of the restricting structure moves relative to the first portion. The first portion and the second portion of the restricting structure define a fluid passageway therebetween, the fluid passageway providing fluid communication between the first and second chambers. The cross-sectional area of the fluid passageway changes in response to movement of the second portion relative to the first portion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
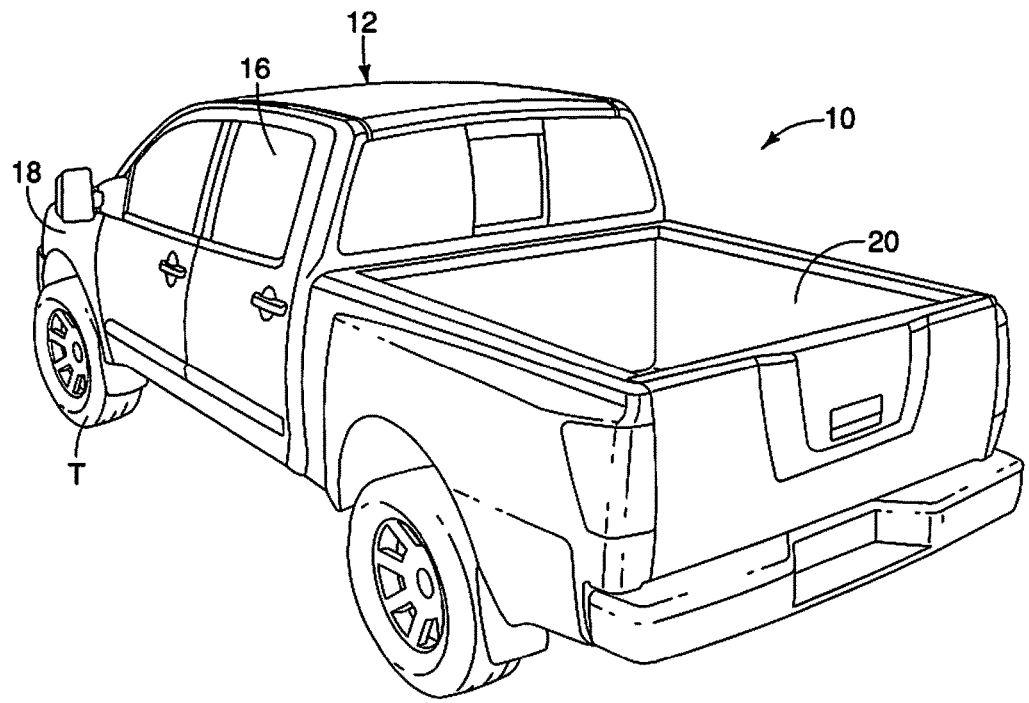
FIG. 1 is a perspective view of a vehicle having a vehicle body structure mounted on a frame in accordance with a first embodiment.

Referring initially to FIG. 1, a vehicle 10 is illustrated in accordance with a first embodiment. The vehicle 10 includes a vehicle body structure 12 and a frame 14 (shown removed from the vehicle 10 in FIG. 2). The vehicle body structure 12 defines a passenger compartment 16, an engine compartment 18 and a cargo area 20. The vehicle body structure 12 is attached to the frame 14 via a plurality of vibration dampening mount assemblies 22 as shown in FIG. 3 and described in greater detail below.

In FIG. 1, the vehicle 10 is depicted as a pickup truck. However, the vibration dampening mount assemblies 22 can be used in any type of vehicle where the construction and design thereof includes a frame, sub-frame or other detachable vehicle structure that attaches to and supports a main portion of a vehicle body structure. For example, the vibration dampening mount assemblies 22 can be used in a vehicle between a unibody body structure and a corresponding sub-frame or engine cradle of the vehicle. Additionally, the vibration dampening mount assembly 22 can be used in a vehicle between an engine and a corresponding engine cradle or frame of a vehicle to dampen vibrations from an engine.

Figure 2:
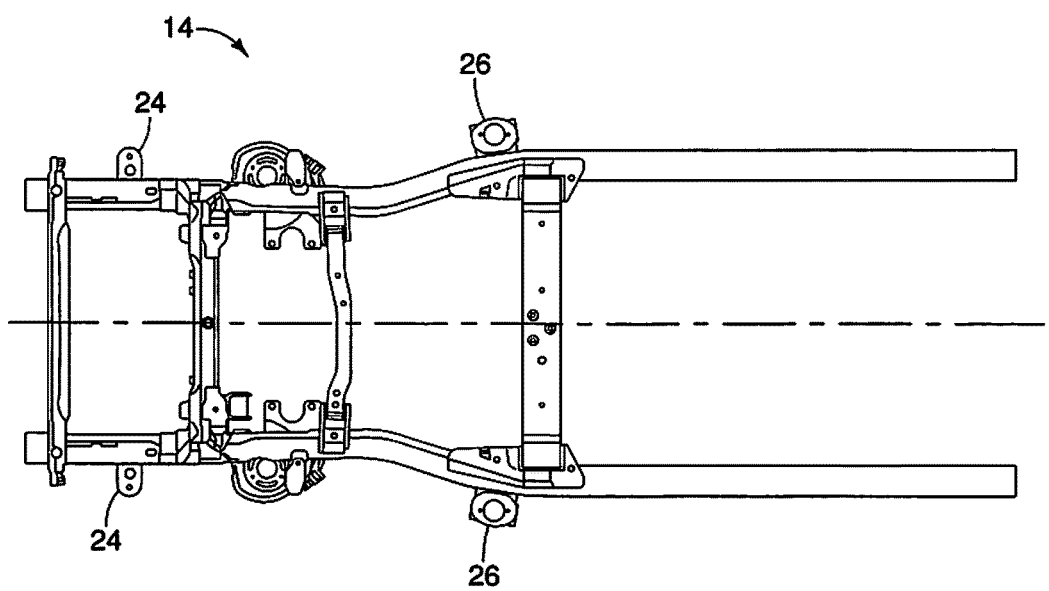
FIG. 2 is a bottom view of the frame shown removed from the vehicle having a plurality of mounting portions in accordance with the first embodiment.

As shown in FIG. 2, the frame 14 includes at least two front mounting portions 24 and at least two mid-body mounting portions 26 that are configured to support the vehicle body structure 12. The frame 14 can include additional mounting portions (not shown) depending upon the design and configuration of the vehicle body structure 12 and the frame 14. The cargo area 20, suspension structures, power plant (motor) are supported to the frame 14 in conventional manners via, for example, additional mounting portions and additional vibration dampening mount assemblies 22. Since vehicle body structure, frames and mounting portions are conventional vehicle components, further description is omitted for the sake of brevity.

Figure 3:
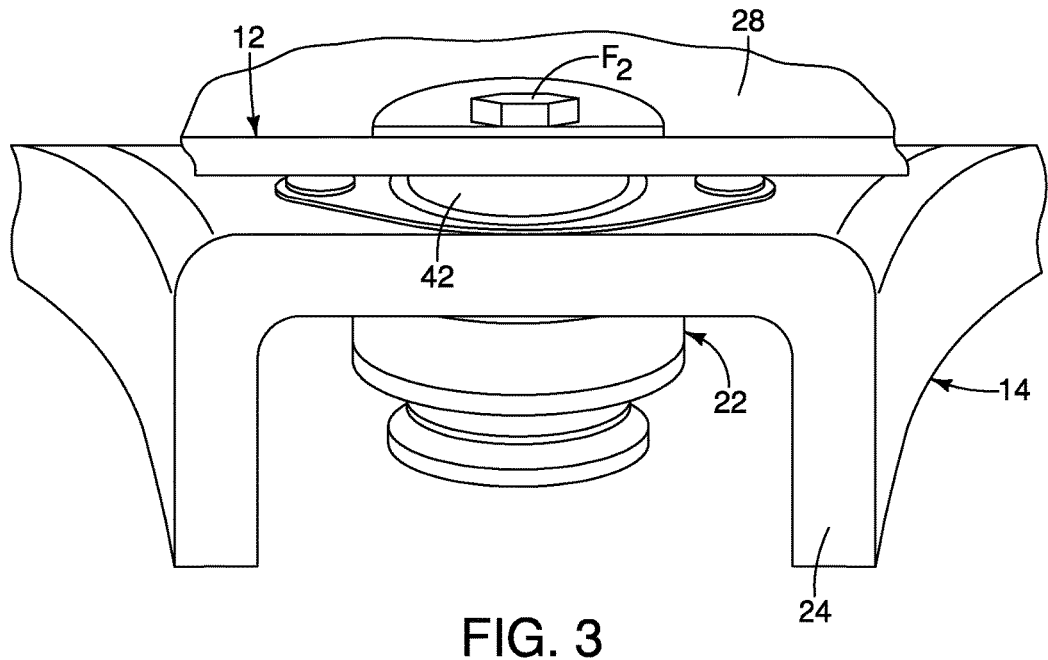
FIG. 3 is a perspective view of one of the plurality of mounting portions of the frame, a corresponding mounting portion of the vehicle body structure with a vibration dampening mounting assembly attached therebetween in accordance with the first embodiment.

As shown in FIG. 3, one of the vibration dampening mount assemblies 22 is mechanically attached to one of the front mounting portions 24 and to a corresponding mounting portion 28 of the vehicle body structure 12. The vibration dampening mount assembly 22 separates the vehicle body structure 12 and the frame 14 and is configured to absorb and dampen vibrations that might otherwise be transmitted from the frame 14 to the vehicle body structure 12 (and vice-versa).

A description of one of the vibration dampening mount assemblies 22 is now provided with specific reference to FIGS. 4-8. Since each of the vibration dampening mount assemblies 22 are identical to one another, description of one of the vibration dampening mount assemblies 22 below applies equally to each of the vibration dampening mount assemblies 22. The vibration dampening mount assembly 22 is shown removed from the vehicle 10 in FIG. 4-10. The vibration dampening mount assemblies 22 includes a load bearing portion 42 and a hydraulic damper portion 44.

The vibration dampening mount assembly 22 is fixedly installed to the frame 14 via fasteners $F_1$. The vibration dampening mount assembly 22 is further fixedly installed to the mounting portion 28 of the vehicle body structure 12 via a fastener $F_2$.

Figure 5:
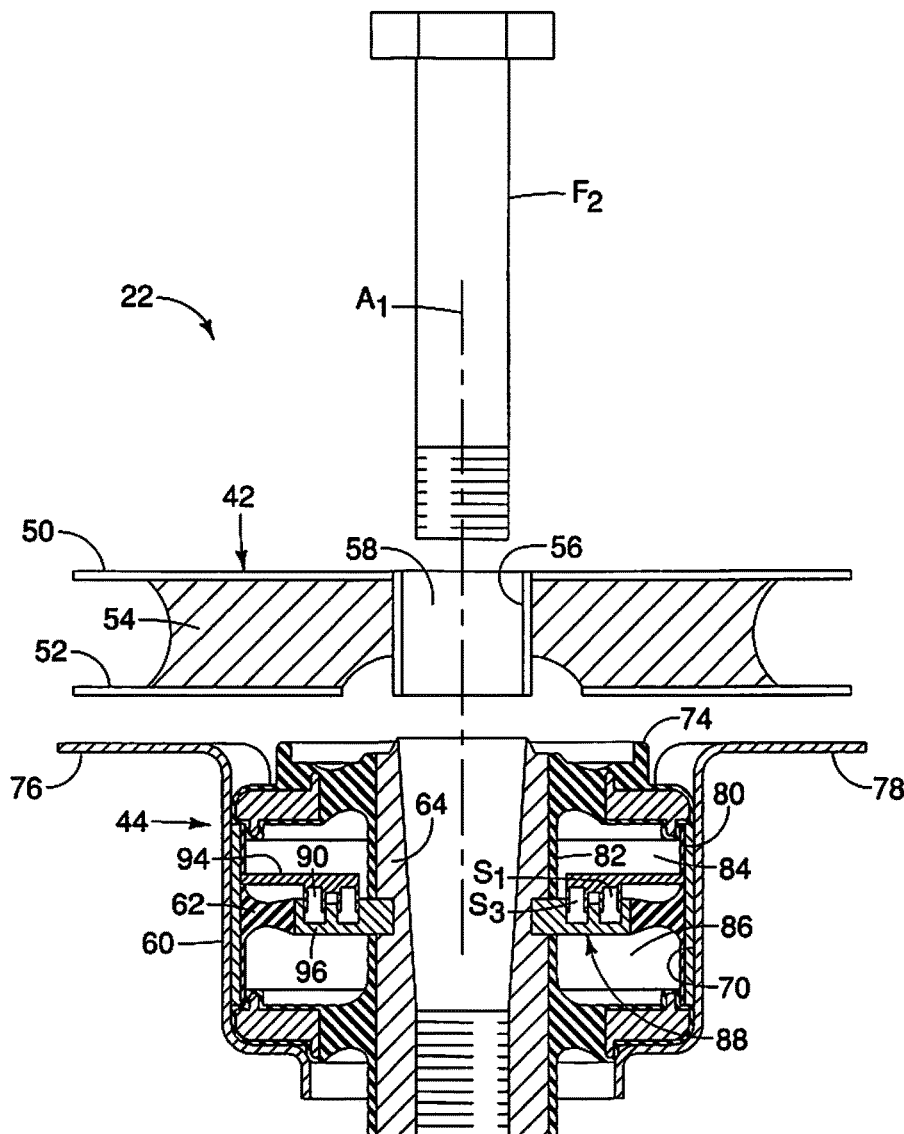
FIG. 5 is an exploded cross-sectional view of the vibration dampening mounting assembly showing details of a load bearing portion, and a hydraulic damper portion that includes a housing, a sleeve portion and a resilient portion that defines an upper fluid chamber and a lower fluid chamber, with a restricting structure disposed between the upper and lower fluid chambers with the hydraulic damper portion and the restricting structure in an at rest orientation in accordance with the first embodiment.
Figure 6:
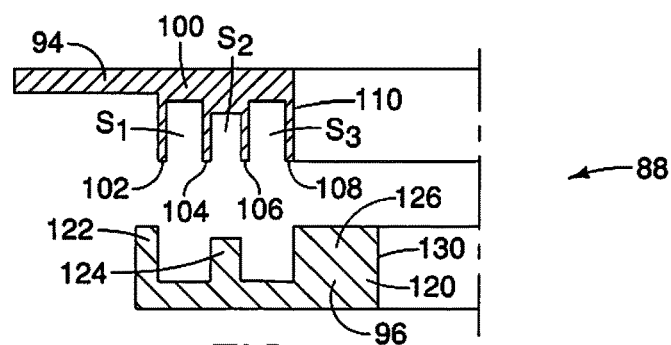
FIG. 6 is a cross-sectional view of a portion of the restricting structure shown removed from the hydraulic damper portion, showing details of a first portion and a second portion of the restricting structure having spaces between respective protrusions that define a passageway that provides fluid communication between the upper fluid chamber and the lower fluid chamber in accordance with the first embodiment.

As shown in FIG. 5, the load bearing portion 42 includes an upper bearing plate 50 spaced from a lower mounting plate 52. The load bearing portion 42 further includes a damping member 54 (sometimes referred to as a main rubber element) such as an elastomeric material or natural rubber, that is secured at opposite ends to the upper mounting plate 50 and the lower mounting plate 52, respectively. The damping member 54 can be mold to or otherwise bonded to the upper and lower mounting plates 50 and 52 in a conventional manner. The load bearing portion 42, including the upper and lower mounting plates 50 and 52, and the dampening member 54, include a first sleeve portion 56 that defines a central aperture 58 dimensioned to receive the fastener $F_2$. The dampening member 54 is also molded to or bonded to a radially outer surface of the first sleeve portion 56.

Figure 4:
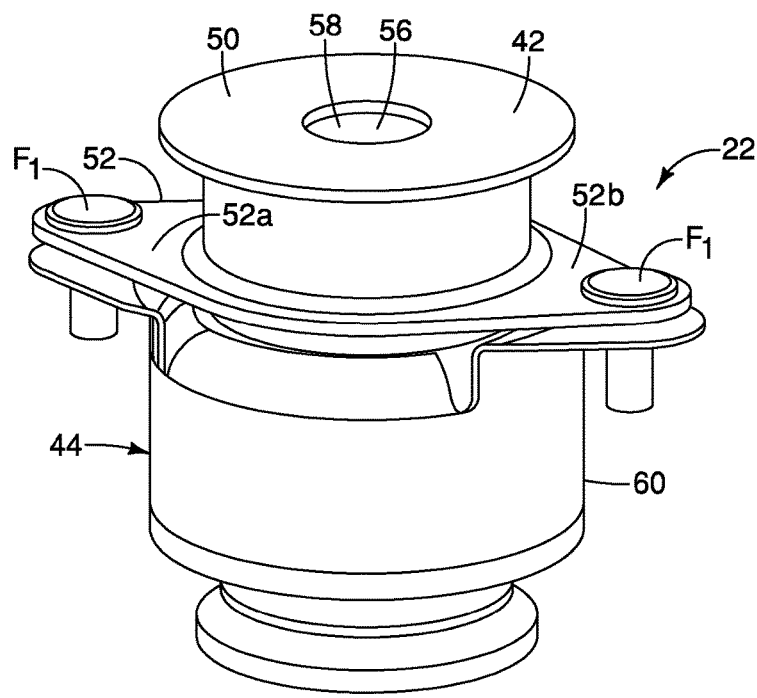
FIG. 4 is a perspective view of the vibration dampening mounting assembly shown removed from the vehicle in accordance with the first embodiment.

As shown in FIG. 4, the lower mounting plate 52 includes attachment flanges 52a and 52b that extend laterally outward. Each of the flanges 52a and 52b includes an opening that receive the fasteners $F_1$.

The upper and lower mounting plates 50 and 52, and the first sleeve portion 56 are formed from any suitably hard material such as a composite material, aluminum, steel, etc. The dampening member 54 is formed from any suitably performing compliant substance, such as, an elastomer, natural rubber, polymer, etc. The upper mounting plate 50 and the first sleeve portion 56 are preferably formed from separate metal components that are from one another to allow movement of the first sleeve portion 56 relative to the upper mounting plate 50. The first sleeve portion 56 is not connected to the lower mounting plate 52 to allow relative movement between the first sleeve portion 56 and the upper and lower mounting plates 50 and 52. It should be understood that the first sleeve portion 56 and the upper and lower mounting plates 50 and 52 can be formed from the same type of rigid material (for example, metal) or from a rigid composite material.

As shown in FIG. 5, the hydraulic damper portion 44 includes a housing 60, a resilient material section 62 and a second sleeve portion 64.

The housing 60 is basically a rigid metal element that has an overall cylindrical shaped. The housing 60 further has an interior surface 70, a first end 72 (a lower end), a second end 74 (an upper end) and attachment flanges 76 and 78. Each of the attachment flanges 76 and 78 includes a corresponding opening that aligns with the openings in the flanges 52a and 52b and receive the fasteners $F_1$.

The resilient material section 62 has an outer portion 80 that is fixedly attached to the interior surface 70 of the housing 60. The outer portion 80 is molded to or adhesively fixed to the interior surface 70. The outer portion 80 has an annular or cylindrical shape confirming to the cylindrical shape of the housing 60. The resilient material section 62 has an inner portion 82 that is fixed to a radially outer surface of the second sleeve portion 64. The resilient material section 62 further defines a first chamber 84 and a second chamber 86. The first chamber 84 and the second chamber 86 are annular shaped chambers that are concentrically extend around the second sleeve portion 64. The first chamber 84 and the second chamber 86 are filled with hydraulic fluid, as described in greater detail below.

The resilient material section 62 can be a single molded element, or can be assembled from a plurality of separate members molded or adhered together in a conventional manner forming the depicted resilient material section 62. As shown in FIG. 5, the resilient material section 62 includes a restricting structure 88.

The restricting structure 88 is disposed between the first chamber 84 and the second chamber 86 defining a passageway 90 that provides fluid communication between the first chamber 84 and the second chamber 86. The restricting structure 88 basically includes a first portion 94 and a second portion 96 with the passageway 90 being defined in gaps or spaces (described further below) between the first portion 94 and the second portion 96. The first portion 94 of the restricting structure 88 is configured to be non-movable relative to the housing 60 but is movable relative to the second sleeve portion 64 (the second sleeve portion 64 is movable relative to the housing 60 and the first portion 94). The second portion 96 of the restricting structure 88 is configured to be non-movable relative to the second sleeve portion 64 but is movable relative to the housing 60.

Figure 7:
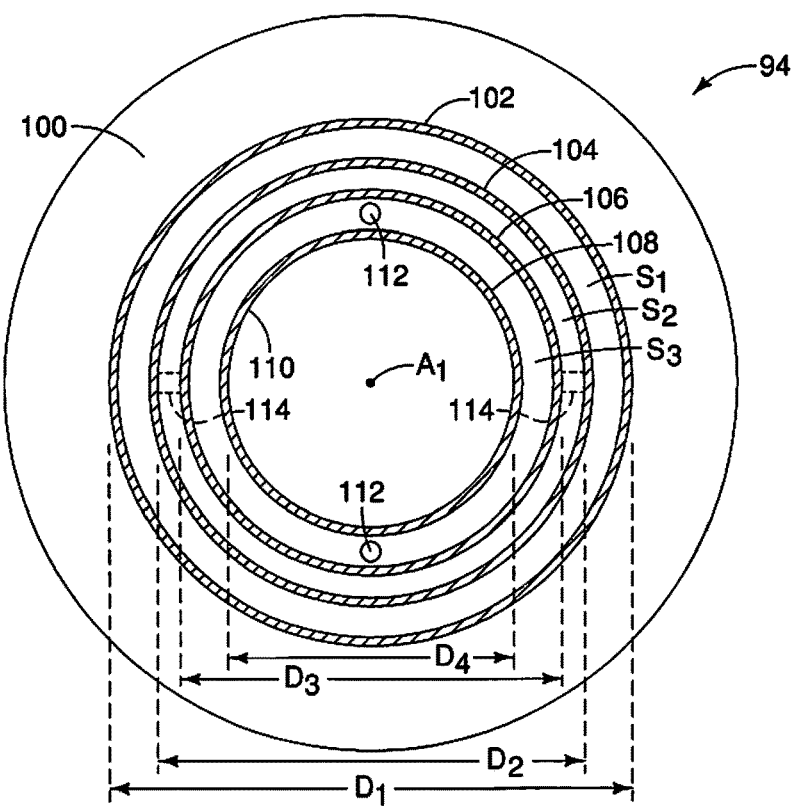
FIG. 7 is a plan view of a lower surface of the first portion of the restricting structure shown removed from the hydraulic damper portion showing a plurality of annular projections with the spaces of the passageway defined therebetween in accordance with the first embodiment.

As shown in FIGS. 6-7 and 9-10, the first portion 94 of the restricting structure 88 is an annular shaped disk member that includes a main disk part 100 that has an upper surface that is planar and a lower surface that includes a first projection 102, a second projection 104, a third projection 106, a fourth projection 108 and a central opening 110. The main disk part 100, the first projection 102, the second projection 104, the third projection 106 and the fourth projection 108 are unitarily formed as a single monolithic element. For example, the first portion 94 can be made of a molded rigid polymer material or can be a metal element that is machined to form each of the first projection 102, the second projection 104, the third projection 106 and the fourth projection 108. Each of the first projection 102, the second projection 104, the third projection 106 and the fourth projection 108 are ring shaped or annular shaped structures that are concentrically arranged about a central axis $A_1$ of the vibration dampening mount assembly 22. For example, a radially outward surface of the first projection 102 defines a first diameter $D_1$, a radially inward surface of the second projection 104 defines a second diameter $D_2$, a radially outward surface of the third projection 106 defines a third diameter $D_3$ and a radially inward surface of the fourth projection 108 defines a fourth diameter $D_4$. The first diameter $D_1$ is larger than the second diameter $D_2$, the second diameter $D_2$ is larger than the third diameter $D_3$, and the third diameter $D_3$ is larger than the fourth diameter $D_4$, as shown in FIG. 7.

As shown in FIGS. 6-7 and 9-10 a first annular space $S_1$ is partially defined between the first projection 102 and the second projection 104 (a pair of first wall sections) and an end wall extending therebetween. A third annular space S3 is partially defined between the second projection 104 and the third projection 106 and an end wall extending therebetween. Further, a third annular space $S_3$ is partially defined between the third projection 106 and the fourth projection 108.

Figure 9:
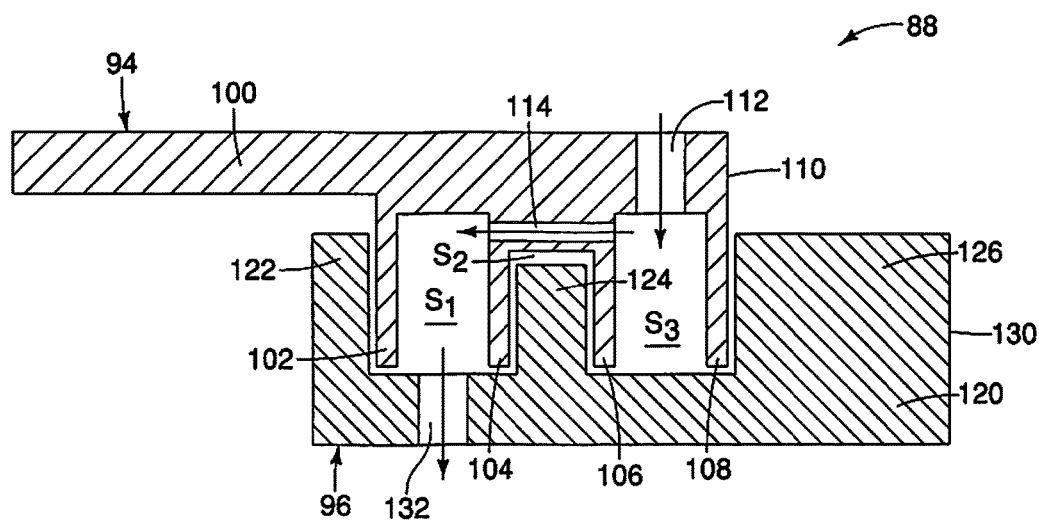
FIG. 9 is a cross-sectional schematic view of the restricting structure showing openings in the first portion that allow fluid to flow between the passageway and the upper fluid chamber and an opening in the second portion of the restricting structure allows fluid to flow between the lower fluid chamber and the passageway, and also schematically showing fluid flowing from the upper fluid chamber through the openings and the passageway to the lower fluid chamber in accordance with the first embodiment.

The main disk part 100 of the first portion 94 of the restricting structure 88 includes first openings 112, as shown in FIGS. 7 and 9. The first openings 112 are open to the first chamber 84 thereby allowing fluid communication between the first chamber 84 and the passageway 90 (partially defined by the first and third annular spaces $S_1$ and $S_3$), as described in greater detail below. The size, number and overall cross-sectional areas of the first openings 112 can be varied depending upon the fluid flow restriction requirements of the vibration dampening mount assembly 22. In other words, the size and overall shape of each of the openings 112 can be varied and dimensioned as required. Further, the main disk part 100 can be provided with only one first opening 112, or can be provided with 3, 4, 5 or 6 first openings 112 as needed for required restriction of fluid flow between the first chamber 84 and the second chamber 86. The first portion 94 is also provided with second openings 114 that extend between and are in fluid communication with each of the first annular space $S_1$ and the third annular space $S_3$ adjacent to the second projection 104 and the third projection 106, as shown in FIG. 7 and shown schematically in FIGS. 9 and 10. The size, number and overall cross-sectional areas of the second openings 114 can be varied depending upon the fluid flow restriction requirements of the vibration dampening mount assembly 22. In other words, the size and overall shape of each of the second openings 114 can be varied and dimensioned as required. Further, the main disk part 100 can be provided with only one second openings 114, or can be provided with 3, 4, 5 or 6 second openings 114 as needed for required restriction of fluid flow between the first chamber 84 and the second chamber 86. Alternatively, or additionally, the second portion 96 can also be provided with openings similar to the second openings 114 providing fluid flow between the first annular space $S_1$ and the t annular space $S_3$. The collective cross-sectional areas of the first openings 112 are preferably equal to or greater than a maximum cross-sectional size of the passageway 90. Further, the collective cross-sectional areas of the second openings 114 are preferably equal to or greater than a maximum cross-sectional size of the passageway 90.

As shown in FIGS. 6 and 8-10, the second portion 96 of the restricting structure 88 is also an annular shaped disk member that includes a main disk part 120 that has a lower surface that is planar and an upper surface that includes a first projection 122, a second projection 124, a third projection 126 and a central opening 130. The second portion 96 is non-movably fixed to the second sleeve portion 64 such that the surface that defines the central opening 130 contacts or is fixedly connected to the second sleeve portion 64. The main disk part 120, the first projection 122, the second projection 124 and the third projection 126 are unitarily formed as a single monolithic element. For example, the second portion 96 can be made of a molded rigid polymer material or can be a metal element that is machined to form each of the first projection 122, the second projection 124 and the third projection 126. Each of the first projection 122, the second projection 124 and the third projection 126 are ring shaped or annular shaped structures that are concentrically arranged about the central axis $A_1$ of the vibration dampening mount assembly 22. For example, a radially inward surface of the first projection 122 defines a fifth diameter $D_5$, a radially outward surface of the second projection 124 defines a sixth diameter $D_6$, a radially inward surface of the second projection 124 defines a seventh diameter $D_7$ and a radially outward surface of the third projection 126 defines an eighth diameter $D_8$.

The main disk part 120 of the second portion 96 of the restricting structure 88 includes third openings 132, as shown in FIGS. 6 and 8-10. The third openings 132 are open to the second chamber 86 thereby allowing fluid communication between the passageway 90 (partially defined by the first and third annular spaces $S_1$ and $S_3$) and the second chamber 86. The size, number and overall cross-sectional areas of the third openings 132 can be varied depending upon the fluid flow restriction requirements of the vibration dampening mount assembly 22. In other words, the size and overall shape of each of the third openings 132 can be varied and dimensioned as required. Further, the main disk part 120 can be provided with only one third opening 132, or can be provided with 3, 4, 5 or 6 third openings 132 as needed for required restriction of fluid flow between the first chamber 84 and the second chamber 86 via the passageway 90. The collective cross-sectional areas of the third openings 132 are preferably equal to or greater than a maximum cross-sectional size of the passageway 90.

Figure 10:
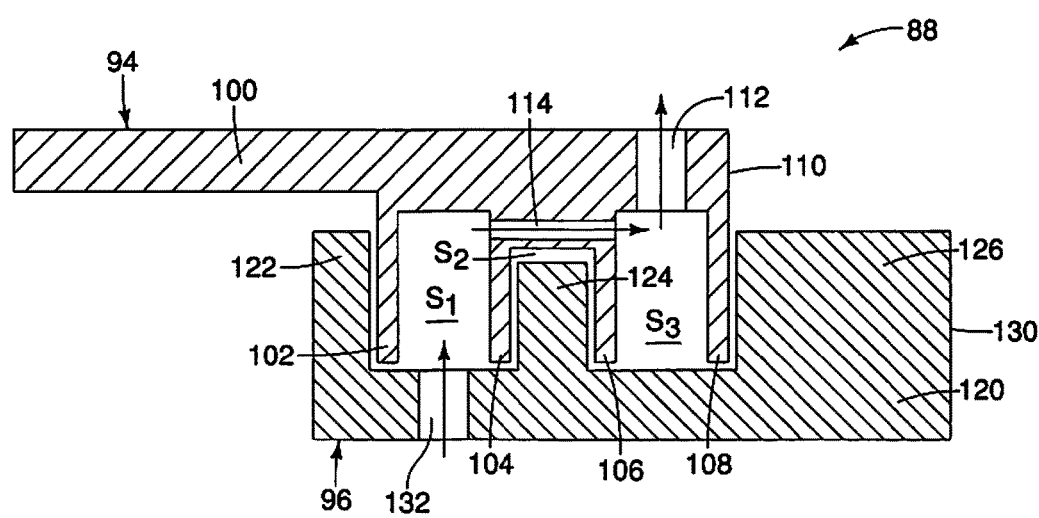
FIG. 10 is another cross-sectional schematic view of the restricting structure showing fluid flowing from the lower fluid chamber through the openings and the passageway to the upper fluid chamber in accordance with the first embodiment.

The first portion 94 and the second portion 96 are dimensioned and oriented to mate with one another, as is shown schematically in cross-section in FIGS. 9 and 10. Specifically, the first and second projection 102 and 104 of the first portion 94 are dimensioned and positioned to insert and slidable move between the first and second projections 122 and 124 (a pair of second wall sections) of the second portion 96. The second projection 124 of the second portion 96 is dimensioned and positioned to insert and simultaneously slide between the second and third projections 104 and 106 of the first portion 94. Further, the third and fourth projections 106 and 108 are dimensioned and positioned to insert and slidable move between the second and third projections 124 and 126 of the second portion 96.

Further, the first diameter $D_1$ is approximately equal to the fifth diameter $D_5$ within a predetermined tolerance such that the first diameter $D_1$ is machined slightly smaller than the fifth diameter $D_5$ to allow for unhindered sliding movement between the first projection 102 and the first projection 122 in a direction parallel to the central axis $A_1$. Similarly, the second diameter $D_2$ is approximately equal to the sixth diameter $D_6$ within a predetermined tolerance such that the second diameter $D_2$ is machined slightly larger than the sixth diameter $D_6$ to allow for unhindered sliding movement between the second projection 104 and the second projection 124 in a direction parallel to the central axis $A_1$.

The third diameter $D_3$ is approximately equal to the seventh diameter $D_7$ within a predetermined tolerance except that the third diameter $D_3$ is machined slightly smaller than the seventh diameter $D_7$ to allow for unhindered sliding movement between the third projection 106 and the second projection 124 in a direction parallel to the central axis $A_1$. Similarly, the fourth diameter $D_4$ is approximately equal to the eighth diameter $D_8$ within a predetermined tolerance such that the fourth diameter $D_4$ is machined slightly larger than the eighth diameter $D_8$ to allow for unhindered sliding movement between the fourth projection 108 and the third projection 126 in a direction parallel to the central axis $A_1$.

As shown schematically in FIGS. 9 and 10, the first portion 94 and the second portion 96 mate with one another such that the first annular space $S_1$ and the third annular space $S_3$ are defined therebetween and further define the passageway 90. Specifically, the first annular space $S_1$ is defined between the first projection 102, the second projection 104 and the end surface portion extending therebetween of the main disk part 100 of the first portion 94, and further defined between the first projection 122, the second projection 124 and an end surface portion therebetween of the main disk part 120 of the second portion 94. The third annular space $S_3$ is defined between the third projection 106, the fourth projection 108 and an end surface portion extending therebetween of the main disk part 100 of the first portion 94, and further defined between the second projection 124, the third projection 126 and a surface portion therebetween of the main disk part 120 of the second portion 94.

Figure 11:
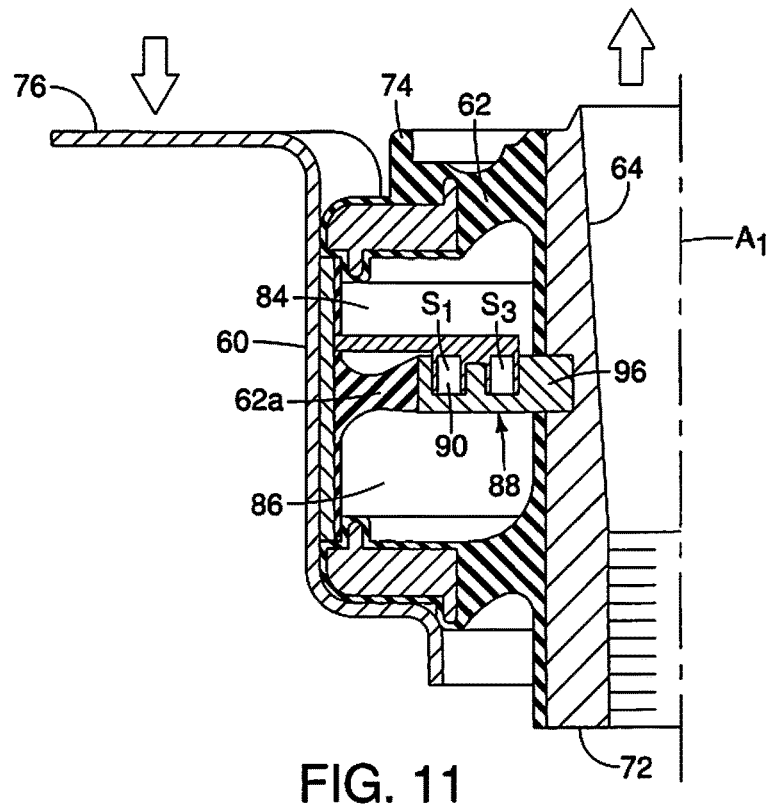
FIG. 11 is a cross-sectional view of a portion of the vibration dampening mounting assembly showing the sleeve portion moved upward relative to the housing in response to vibrations with the second portion of the restricting structure moved upward relative to the first portion in a first displaced orientation such that a flow rate through the passageway is diminished or reduced due to reduction in the cross-sectional area of the spaces that define the passageway in accordance with the first embodiment.
Figure 12:
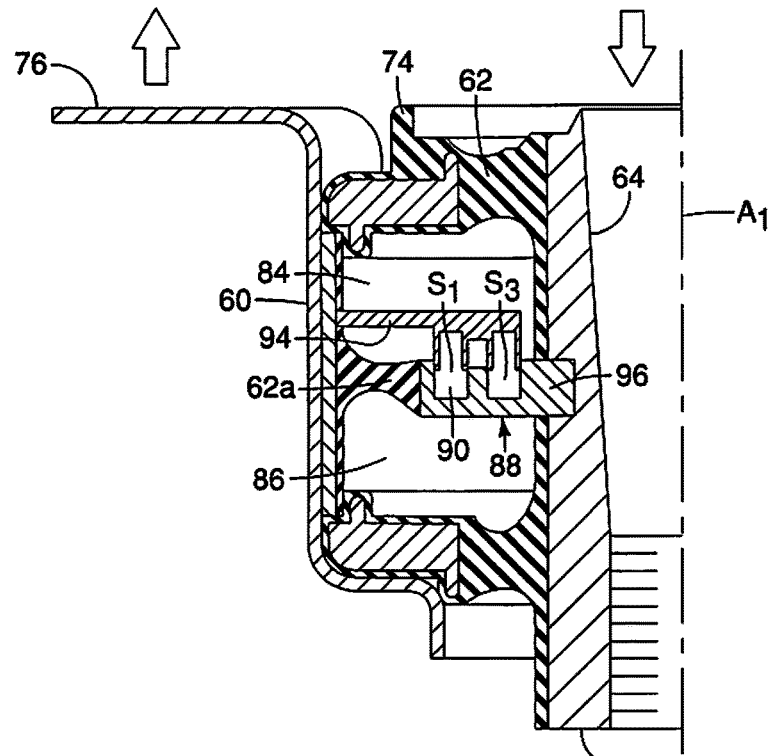
FIG. 12 is another cross-sectional view of the portion of the vibration dampening mounting assembly depicted in FIG. 10, showing the sleeve portion moved downward relative to the housing in response to vibrations with the second portion of the restricting structure moved downward relative to the first portion in a second displaced orientation such that the flow rate through the passageway is increased due to an increase in the cross-sectional area of the spaces that define the passageway in accordance with the first embodiment.

In the first embodiment, as shown in FIGS. 5, 11 and 12, the first portion 94 of the restricting structure 88 is fixedly and non-movably attached to the housing 60. The second portion 96 of the restricting structure 88 is non-movably attached to the second sleeve portion 64. Further, the second portion 96 is flexibly attached to the housing 60 via a section 62a of the resilient material section 62. In response to vibrations, the housing 60 and the second sleeve portion 64 can undergo relative movement with respect to one another along the central axis $A_1$ of the vibration dampening mount assembly 22. Hence, in response to movement along the central axis $A_1$ by the vibration dampening mount assembly 22, the first portion 94 and the second portion 96 of the restricting structure 88 undergo movement with respect to another. FIG. 5 shows the first portion 94 and the second portion 96 of the restricting structure 88 in an at rest orientation. FIG. 11 shows the first portion 94 and the second portion 96 moved toward one another, while FIG. 12 shows the first portion 94 and the second portion 96 moved away from one another due to vibrations which cause movement along the central axis $A_1$.

Figure 8:
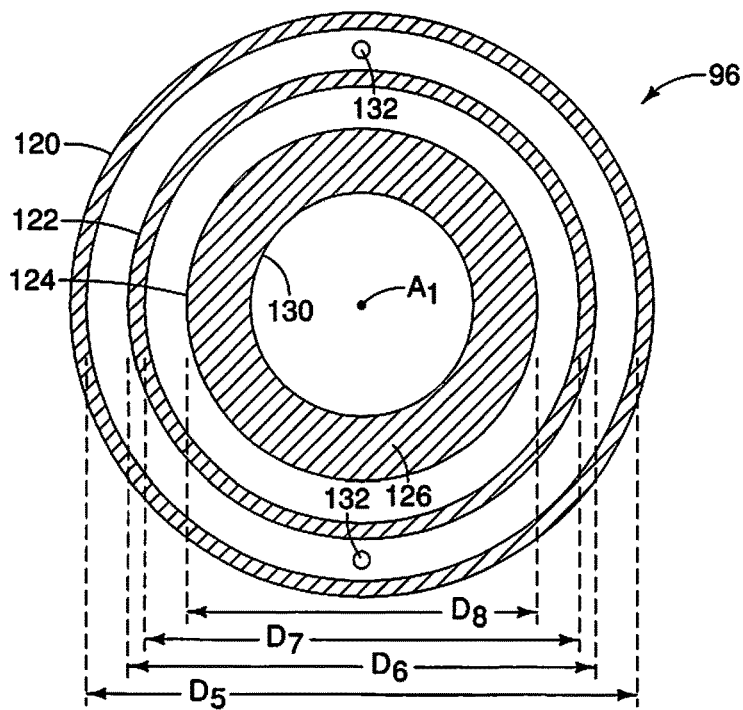
FIG. 8 is a plan view of an upper surface of the second portion of the restricting structure shown removed from the hydraulic damper portion showing a plurality of annular projections with the spaces of the passageway defined therebetween in accordance with the first embodiment.

It should be understood from the depictions in FIGS. 7 and 8, that the first portion 94 and the second portion 96 and the first, second and third openings 112, 114 and 132 are arranged such that the spaces $S_1$ and $S_3$ define the passageway 90 as a labyrinth through which hydraulic fluid can flow. Specifically, when fluid enters the first openings 112 and into the third space $S_3$, the fluid must travel in a circumferential direction through the third space $S_3$ in order to get to the second opening 114. Once the fluid passes through the second opening 114, the fluid then moves into the first space $S_1$ and must travel in the circumferential direction through the first space $S_1$ in order to get to the third openings 132. The first and second portions 94 and 96 are oriented relative to one another such that the second openings 114 are circumferentially offset from the third openings 132 by approximately 90 degrees. Once the fluid reaches the third openings 132, the fluid can flow into the second chamber 86. When fluid flows from the second chamber 86 to the first chamber 84, the reverse of the flow sequence describe above occurs.

Hence, it should be understood by comparing FIGS. 7 and 8 with FIGS. 9 and 10 that the depiction in FIGS. 9 and 10 are schematic, and do not reflect the actual locations of the first, second and third openings 112, 114 and 132 relative to the circumferential directions of the first portion 94 and the second portion 96.

As a result of the movement between the second sleeve portion 64 and the housing 60 along the central axis $A_1$, the volume of fluid within each of the first chamber 84 and the second chamber 86 changes. Specifically, as shown in FIG. 11, upward movement of the second sleeve portion 64 relative to the housing 60 causes the volume of the first chamber 84 to decrease while the volume within the second chamber 86 increases relative to the respective volumes depicted in FIG. 5 (with the vibration dampening mount assembly 22 in the at rest orientation). Further, as shown in FIG. 12 downward movement of the second sleeve portion 64 relative to the housing 60 causes the volume of the first chamber 84 to increase while the volume within the second chamber 86 decreases relative to the respective volumes depicted in FIG. 5. During such movement, hydraulic fluid within the first chamber 84 moves to and from the second chamber 86 via the passageway 90 defined by the spaces $S_1$ and $S_3$ within the restricting structure 88.

The movement of fluid through passageway 90 is depicted schematically in FIGS. 9 and 10. Specifically, in FIG. 9, arrows extending through one of the first openings 112, one of the second opening 114 and one of the third opening 132 provides an indication of the flow of fluid leaving the first chamber 84, moving through the passage 90 and into the second chamber 86. Similarly, in FIG. 10, arrows extending through one of the first openings 112, one of the second opening 114 and one of the third opening 132 provides an indication of the flow of fluid leaving the second chamber 86, moving through the passage 90 and into the first chamber 84.

The restricting structure 88 is configured to vary the fluid flow volume through the passageway 90 in response to vibrations. Hence the fluid flow rate of movement through the passageway 90 changes in response to vibrations. Specifically, movement of the first portion 94 relative to the second portion 96 changes the size of the cross-sectional areas of each of the spaces $S_1$ and $S_3$. The passageway 90 is defined within the restricting structure 88 by the spaces $S_1$ and $S_3$. Changes in the cross-sectional areas of each of the spaces $S_1$ and $S_3$ alters the overall size of the passageway 90, thereby changing the rate of flow of hydraulic fluid therethrough. For example, as shown in FIG. 5 with the vibration dampening mount assembly 22 and the restricting structure 88 in an at rest orientation, the cross-sectional area of the spaces $S_1$ and $S_3$ allows for a first flow rate through the passageway 90. In FIG. 11, the second sleeve portion 64 and the second portion 96 of the restricting structure 88 are moved upward relative to the housing 60 and the first portion 94. As a result of this movement, the cross-sectional areas of each of the spaces $S_1$ and $S_3$ are reduced, thereby reducing the size of the passageway 90. Thus, the flow of fluid through the passageway 90 is restricted, as compared to the size of the passageway 90 shown in FIG. 5. In FIG. 12, the second sleeve portion 64 and the second portion 96 of the restricting structure 88 are moved downward relative to the housing 60 and the first portion 94. As a result of this movement, the cross-sectional areas of each of the spaces $S_1$ and $S_3$ are increased relative to their respective sizes shown in FIGS. 5 and 11, thereby increasing the size of the passageway 90. Thus, the flow of fluid through the passageway 90 is less restricted, as compared to the size of the passageway 90 shown in FIGS. 5 and 11.

The vibration characteristics of the vibration dampening mount assembly 22 can be customized depending upon the initial size and orientations of the spaces $S_1$ and $S_3$ (FIG. 5) in order to optimize vibration dampening for the vehicle 10.

The first sleeve portion 56 and the second sleeve portion 64 (the sleeve) define a central aperture 58 (FIG. 3) that extends from proximate the first end 72 of the housing 60 to the second end 74 of the housing 60 with the first chamber 84 and the second chamber 86 being concentric about the central axis $A_1$ (defined by the central aperture).

When the vibration dampening mount assembly 22 is installed to the vehicle 10, the housing 60 is positioned beneath the front mounting portion 24 and the load bearing portion 42 is positioned above the front mounting portion 24, as shown in FIG. 3. The fasteners $F_1$ are inserted into the openings in the flanges 52a and 52b, further pass through apertures in the front mounting portion 24 (not shown) and then into the openings in the flanges 76 and 78. Lower fastening nuts Ware threaded on to the fasteners $F_1$ and tightened, securing the housing and the load bearing portion 42 to the frame 14.

Next, the vehicle body structure 12 is lowered on to the frame 14 such that an opening in the mounting portion 28 of the vehicle body structure 12 aligns with the central aperture 58 of the load bearing portion 42. The fastener $F_2$ is then inserted into the opening in the mounting portion 28, and further through the central aperture 58 and the second sleeve portion 64. The fastener $F_2$ is then tightened and secured to the threads at the lower end of the second sleeve portion 64.

When there is relative vibration between the frame 14 and the vehicle body structure 12, the vibration dampening mount assembly 22 cushions, absorbs and dampens the vibrations. The dampening member 54 of the load bearing portion 56 and the resilient material 62 within the housing 60 absorbs and cushions some vibrations. However, movement of the hydraulic fluid between the first and second chambers 84 and 86 further dampens vibrations, with varying dampening characteristics, depending upon the positioning of the first portion 94 relative to the second portion 96 of the restricting structure 88, as described above.

More specifically, each vibration is an oscillation of up and down movement of the first and second sleeve portions 56 and 64 relative to the housing 60. In those portions of each oscillation where the overall cross-sections of the spaces $S_1$ and $S_2$ are reduced or at a minimum, flow of fluid between the first chamber 84 and the second chamber 86 is severely restricted such that the movement of the first and second sleeve portions 56 and 64 relative to the housing 60 is similarly dampened. In those portions of each oscillation where the overall cross-sections of the spaces $S_1$ and $S_2$ are increase or at a maximum, flow of fluid between the first chamber 84 and the second chamber 86 is less restricted such that the movement of the first and second sleeve portions 56 and 64 relative to the housing 60 is allowed to more readily occur.

Second Embodiment

Referring now to FIGS. 13-16, a vibration dampening mount assembly 122 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 13:
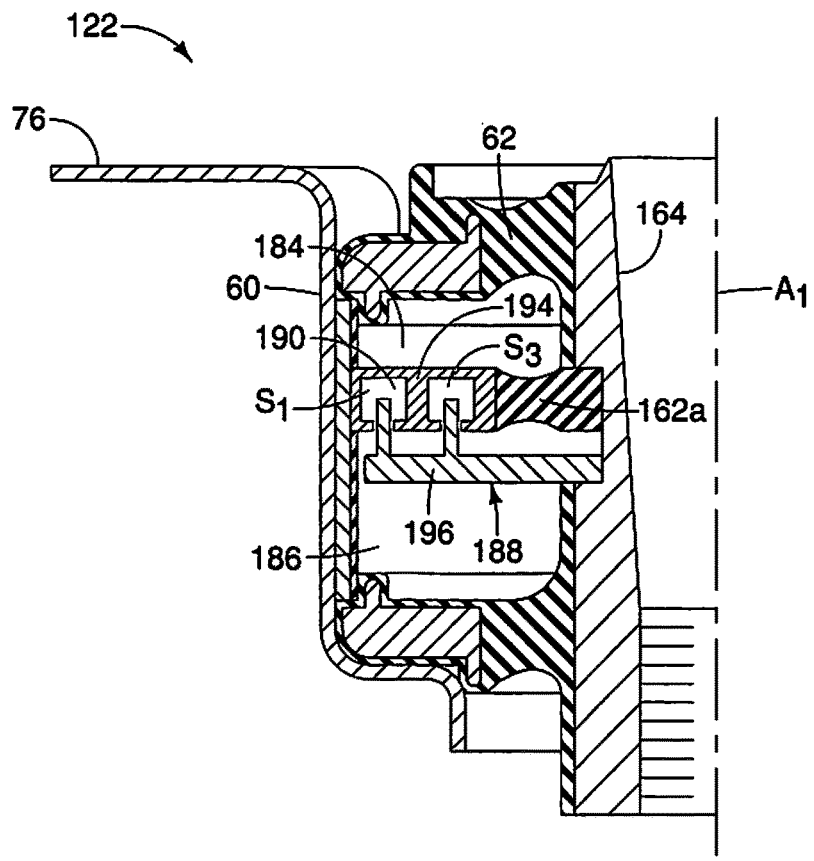
FIG. 13 is a cross-sectional view of a vibration dampening mounting assembly showing details of a hydraulic damper portion that includes a housing, a sleeve portion and a resilient portion that defines an upper fluid chamber and a lower fluid chamber, with a restricting structure disposed between the upper and lower fluid chambers with the hydraulic damper portion and the restricting structure in an at rest orientation in accordance with a second embodiment.

FIG. 13 is a cross-sectional view of the vibration dampening mounting assembly 122 showing details of the housing 60 and the resilient portion 62 as described above with respect to the first embodiment, and further includes a sleeve portion 164. The resilient portion 62 and the sleeve portion 164 confine an upper fluid chamber 184 and a lower fluid chamber 186, with a restricting structure 188 disposed between the upper and lower fluid chambers 184 and 186. FIG. 13 shows the vibration dampening mounting assembly 122 in an at rest orientation.

Figure 14:
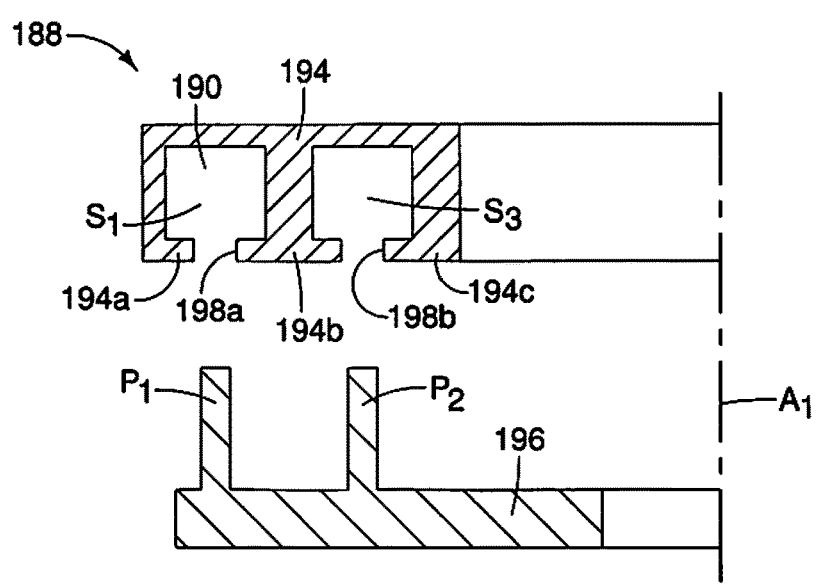
FIG. 14 is a cross-sectional view of a portion of the restricting structure shown removed from the hydraulic damper portion depicted in FIG. 13, showing details of a first portion and a second portion of the restricting structure having spaces between respective protrusions that define a passageway that provides fluid communication between the upper fluid chamber and the lower fluid chamber in accordance with the second embodiment.

A portion of the restricting structure 188 is shown in a cross-sectional view in FIG. 14. Specifically, the restricting structure 188 is shown removed from the vibration dampening mounting assembly 122 in FIG. 14.

The restricting structure 188 includes a first portion 194 and a second portion 196. The first portion 194 has an overall disk or annular shape and is non-movably attached to the housing 60 and the second portion 196 is non-movably attached to the sleeve portion 164. As with the first embodiment, the sleeve portion 164 can undergo limited movement in the directions represented by the central axis $A_1$ relative to the housing 60 in response to vibrations.

As with the first embodiment, in the second embodiment the first and second portions 194 and 196 define a passageway 190 therebetween. Specifically, the first portion 194 includes annular protrusions 194a, 194b and 194c that extend mainly in directions parallel to the central axis $A_1$. An opening 198a is defined between distal (lower) ends of the annular protrusions 194a and 194b. Another opening 198b is defined between distal (lower) ends of the annular protrusions 194b and 194c. A first space $S_1$ is at least partially defined between the annular projections 194a and 194b and an upper end wall extending therebetween. A third space $S_3$ is at least partially defined between the annular projections 194b and 194c and an upper end wall extending therebetween.

An inner radial end of the first portion 194 is elastically fixed to the sleeve portion 164 via a resilient attachment member 162a such that the sleeve portion 164 is movable relative to the first portion 194 and the housing 60.

The second portion 196 has an overall disk or annular shape and includes a pair of annular projections $P_1$ and $P_2$ that extend in directions parallel to the central axis $A_1$. In the at rest orientation depicted in FIG. 13, the annular projection $P_1$ extends through the opening 198a and into the first space $S_1$. The annular projection $P_2$ extends through the opening 198b and into the space $S_2$. Although not shown in FIGS. 13-16, the first portion 194 includes openings that are operably the same as the openings 112 and 114 of the first embodiment. Similarly, the second portion 196 includes openings that are operably the same as the openings 132. Hence, description of the openings 112, 114 and 132 of the second embodiment will be omitted for the sake of brevity. It should be understood from the description and the drawings that include the openings 112, 114 and 132 with respect to the first embodiment, that the openings 112, 114 and 132 are present in the descriptions of each of the restricting structures of each and every embodiment disclosed herein. Therefore, in each of the following embodiment, description of the openings 112, 114 and 132 is omitted for the sake of brevity.

Figure 15:
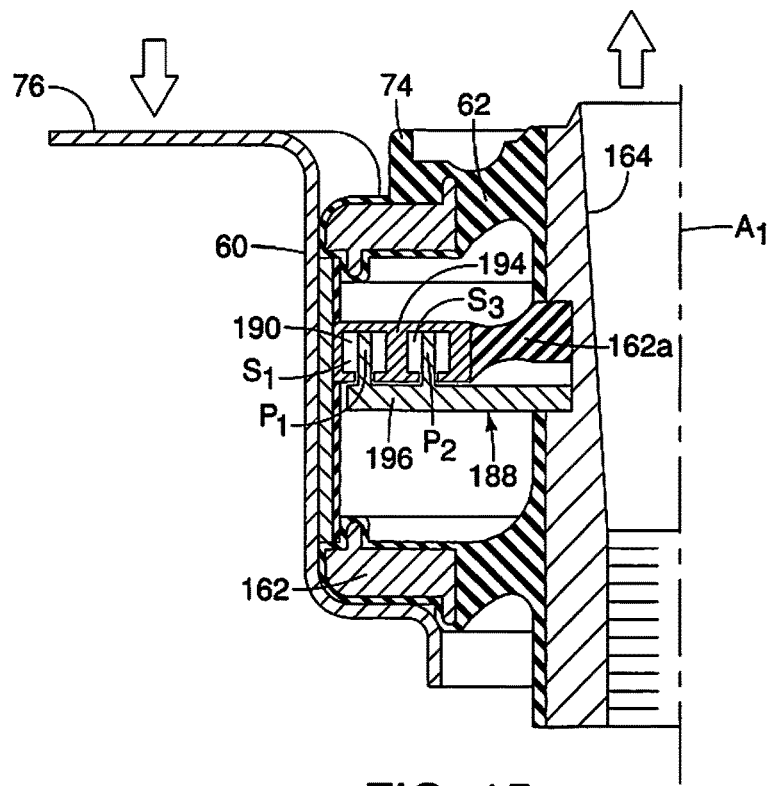
FIG. 15 is a cross-sectional view of the vibration dampening mounting assembly depicted in FIG. 13 showing the sleeve portion moved upward relative to the housing in response to vibrations with the second portion of the restricting structure moved upward relative to the first portion in a first displaced orientation such that a flow rate through the passageway is diminished or reduced due to reduction in the cross-sectional area of the spaces that define the passageway in accordance with the second embodiment.

As shown in FIG. 15, in response to a vibration causing the sleeve portion 164 and the second portion 196 to move upward relative to the housing 60, the annular projections $P_1$ and $P_2$ move further into respective ones of the spaces $S_1$ and $S_2$, as compared to the at rest orientation in FIG. 13, thereby reducing the fluid flow area of the passageway 190 and restricting fluid flow therethrough.

Figure 16:
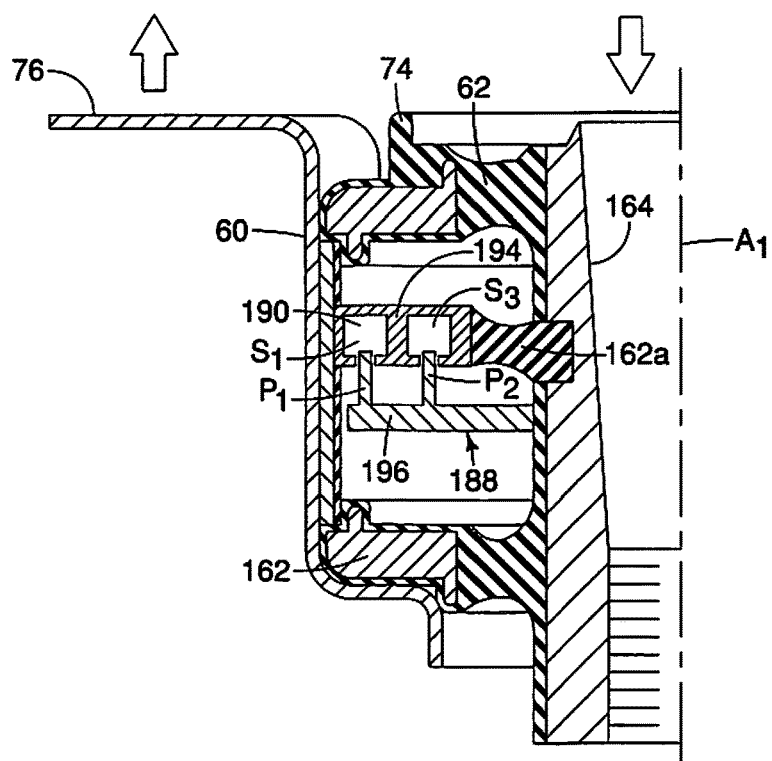
FIG. 16 is another cross-sectional view of the vibration dampening mounting assembly depicted in FIGS. 13 and 15, showing the sleeve portion moved downward relative to the housing in response to vibrations with the second portion of the restricting structure moved downward relative to the first portion in a second displaced orientation such that the flow rate through the passageway is increased due to an increase in the cross-sectional area of the spaces that define the passageway in accordance with the second embodiment.

As shown in FIG. 16, in response to a vibration causing the sleeve portion 164 and the second portion 196 to move downward relative to the housing 60, the annular projections $P_1$ and $P_2$ move partially out of respective ones of the spaces $S_1$ and $S_2$, as compared to the at rest orientation in FIG. 13, thereby increasing the fluid flow area of the passageway 190 and allowing greater fluid flow therethrough.

Third Embodiment

Referring now to FIGS. 17-20, a vibration dampening mount assembly 222 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Figure 17:
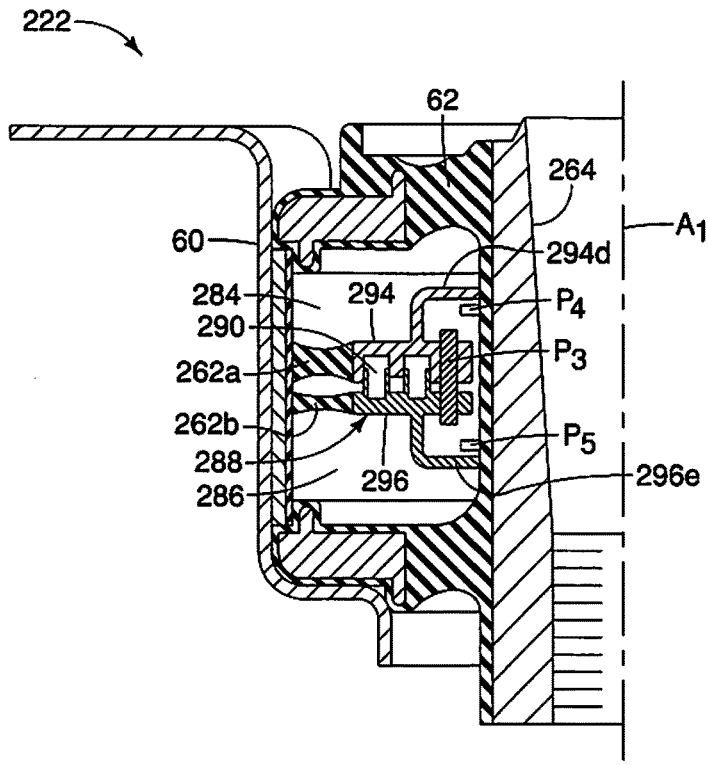
FIG. 17 is a cross-sectional view of a vibration dampening mounting assembly showing details of a hydraulic damper portion that includes a housing, a sleeve portion and a resilient portion that defines an upper fluid chamber and a lower fluid chamber, with a restricting structure disposed between the upper and lower fluid chambers with the hydraulic damper portion and the restricting structure in an at rest orientation in accordance with a third embodiment.

FIG. 17 is a cross-sectional view of the vibration dampening mounting assembly 222 showing details of the housing 60 and the resilient portion 62 as described above with respect to the first embodiment, and further includes a sleeve portion 264. The resilient portion 62 and the sleeve portion 264 define a first fluid chamber 284 (an upper fluid chamber) and a second fluid chamber 286 (a lower fluid chamber), with a restricting structure 288 disposed between the upper and lower fluid chambers 284 and 286. FIG. 17 shows the vibration dampening mounting assembly 222 in an at rest orientation.

Figure 18:
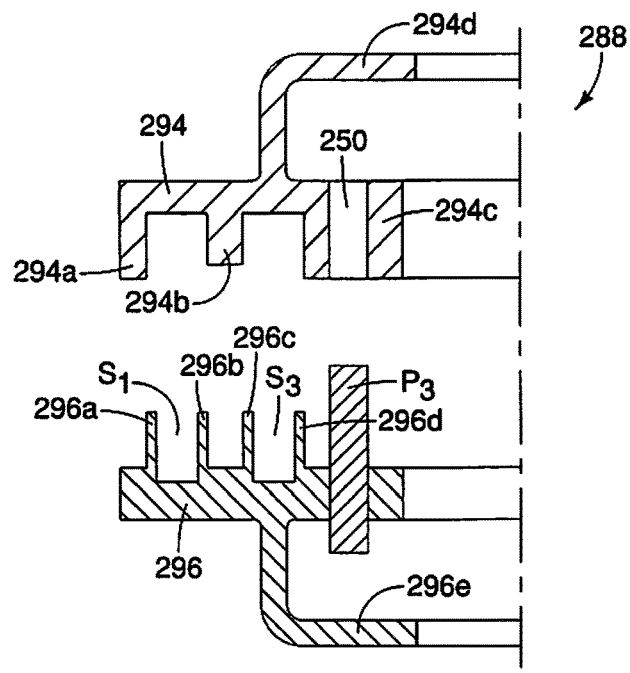
FIG. 18 is a cross-sectional view of a portion of the restricting structure shown removed from the hydraulic damper portion depicted in FIG. 17, showing details of portions of the restricting structure having spaces between therebetween that define a passageway that provides fluid communication between the upper fluid chamber and the lower fluid chamber in accordance with the third embodiment.

The restricting structure 288 is shown in a cross-sectional view in FIG. 18. Specifically, the restricting structure 288 is shown removed from the vibration dampening mounting assembly 222 in FIG. 18.

The restricting structure 288 includes a first portion and a second portion with the first portion being defined by a first part 294 and a second part 296, described further below. As with the first embodiment, the sleeve portion 264 can undergo limited movement in the directions represented by the central axis $A_1$ relative to the housing 60 in response to vibrations.

As with the first embodiment, in the third embodiment the first and second portions 294 and 296 define a passageway 290 therebetween. As shown in FIG. 18, first part 294 includes annular protrusions 294a, 294b and 294c that extend downward mainly in directions parallel to the central axis $A_1$. An opening 250 is defined in the annular protrusion 294c. The first part 294 also includes a first leg 294d that extends toward the sleeve portion 264.

A first space $S_1$ is at least partially defined between the annular projections 294a and 294b and an upper end wall extending therebetween. A third space $S_3$ is at least partially defined between the annular projections 294b and 294c and an upper end wall extending therebetween.

An outer radial end of the first part 294 is elastically fixed to the housing 60 via a resilient attachment member 262a such that the first portion 194 can undergo limited vertical movement relative to the housing 60 and the central axis $A_1$, and can undergo movement relative to the sleeve portion 264.

An outer radial end of the second part 296 is elastically fixed to the housing 60 via a resilient attachment member 262b such that the second part 296 can undergo limited vertical movement relative to the housing 60 and the central axis $A_1$, and can undergo movement relative to the sleeve portion 264.

The second part 296 has an overall disk or annular shape and includes annular projections 296a, 296b, 296c and 296d that extend upward in directions parallel to the central axis $A_1$. The second part 296 also includes a second leg 296e that extends toward the sleeve portion 264.

In the at rest orientation depicted in FIG. 18, the annular projections 296a and 296b extend between the annular projections 294a and 294b, and the annular projections 296c and 296d extend between the annular projections 294b and 294c. Thus, the annular projections 294a and 294b and the annular projections 296a and 296b define the first space $S_1$, and the annular projections 294b and 294c and the annular projections 296c and 296d define the second space $S_2$. The second part 296 also includes an aperture with an alignment pin $P_3$ fixedly retained therein. The alignment pin $P_3$ is non-movably fixed to the second part 296 for movement therewith. The alignment pin $P_3$ extends upward through the opening 250 in the first part 294, thereby maintaining the first part 294 and the second part 296 in alignment with one another during vibrational movements. It should be understood from the drawings and the description herein, that the restricting structure 288 can include several alignment pins $P_3$ in order to maintain alignment between the first part 294 and the second part 296.

Although not shown in FIGS. 17-20, the first part 294 includes openings that are operably the same as the openings 112 and 114 of the first embodiment. Similarly, the second part 296 includes openings that are operably the same as the openings 132. Hence, description of the openings 112, 114 and 132 of the third embodiment will be omitted for the sake of brevity.

The first part 294 is attached to the housing 60 via a resilient elastic material portion 262a and the second part 296 is attached to the housing 60 via a resilient elastic material portion 262b. The first and second parts 294 and 296 are therefore able to undergo limited vertical movement relative to the central axis $A_1$ relative to the housing 60 and relative to the sleeve portion 264.

The second portion of the restricting structure 288 is defined on the sleeve portion 264. Specifically, the sleeve portion 264 includes a pin $P_4$ (or ring) and a pin $P_5$ (or ring) that are fixedly and non-movably attached to the sleeve portion 264. The pin $P_4$ is fixed to the sleeve portion 264 at a location below but adjacent to the first leg 294d. The pin $P_5$ is fixed to the sleeve portion 264 at a location above but adjacent to the second leg 296e.

Figure 19:
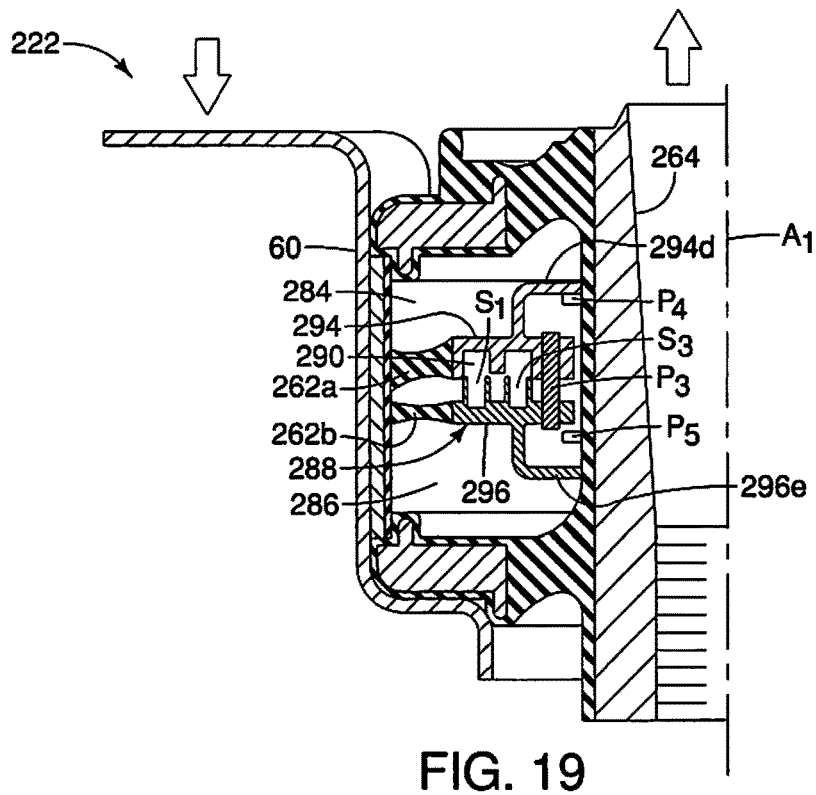
FIG. 19 is a cross-sectional view of the vibration dampening mounting assembly depicted in FIG. 13 showing the sleeve portion moved upward relative to the housing in response to vibrations with a portion of the restricting structure moved upward relative to the housing and a remainder of the restricting structure in a first displaced orientation such that a flow rate through the passageway is increased due to reduction in the cross-sectional area of the spaces that define the passageway in accordance with the third embodiment.

As shown in FIG. 19, in response to a vibration causing the sleeve portion 264 to move upward relative to the housing 60, the first leg 294d contacts the pin $P_4$ causing the first part 294 to move upward. As is also shown in FIG. 19, the annular projections 296a and 296b are at least partially out of the area between the annular projections 294a and 294b and the annular projections 296c and 296d are at least partially moved out of the area between the annular projections 294b and 294c, as compared to the at rest orientation in FIG. 17, thereby increasing overall cross-sectional areas of the spaces $S_1$ and $S_3$. This movement also increases the fluid flow area of the passageway 290 and restricting fluid flow therethrough.

Figure 20:
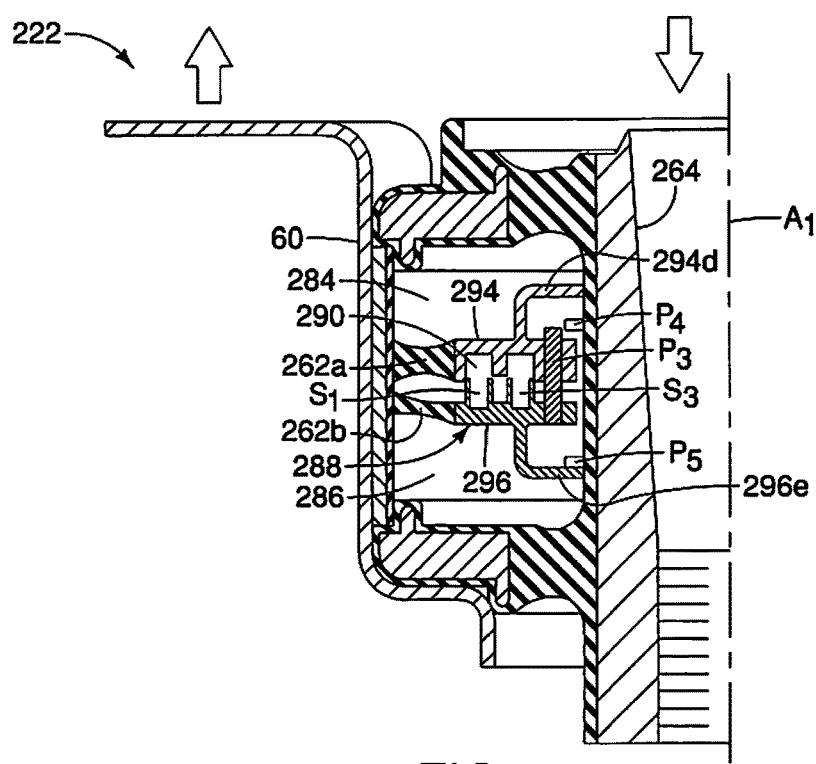
FIG. 20 is another cross-sectional view of the vibration dampening mounting assembly depicted in FIGS. 17 and 19, showing the sleeve portion moved downward relative to the housing in response to vibrations with the remainder of the restricting structure moved downward relative to the housing and the portion of the restricting structure in a second displaced orientation such that a flow rate through the passageway is increased due to reduction in the cross-sectional area of the spaces that define the passageway in accordance with the third embodiment.

As shown in FIG. 20, in response to a vibration causing the sleeve portion 264 to move downward relative to the housing 60, the second leg 296e contacts the pin $P_5$ causing the second part 296 to move downward. As with the movement depicted in FIG. 19, the annular projections 296a and 296b are at least partially out of the area between the annular projections 294a and 294b and the annular projections 296c and 296d are at least partially moved out of the area between the annular projections 294b and 294c, as compared to the at rest orientation in FIG. 17, thereby increasing overall cross-sectional areas of the spaces $S_1$ and $S_3$. This movement also increases the fluid flow area of the passageway 290 and restricting fluid flow therethrough.

Thus, vibrational movement experienced by the vibration dampening mount assembly 222 causes changes in the fluid flow rate through the restricting structure 288 and therefore between the first chamber 284 and the second chamber 286.

Fourth Embodiment

Figure 21:
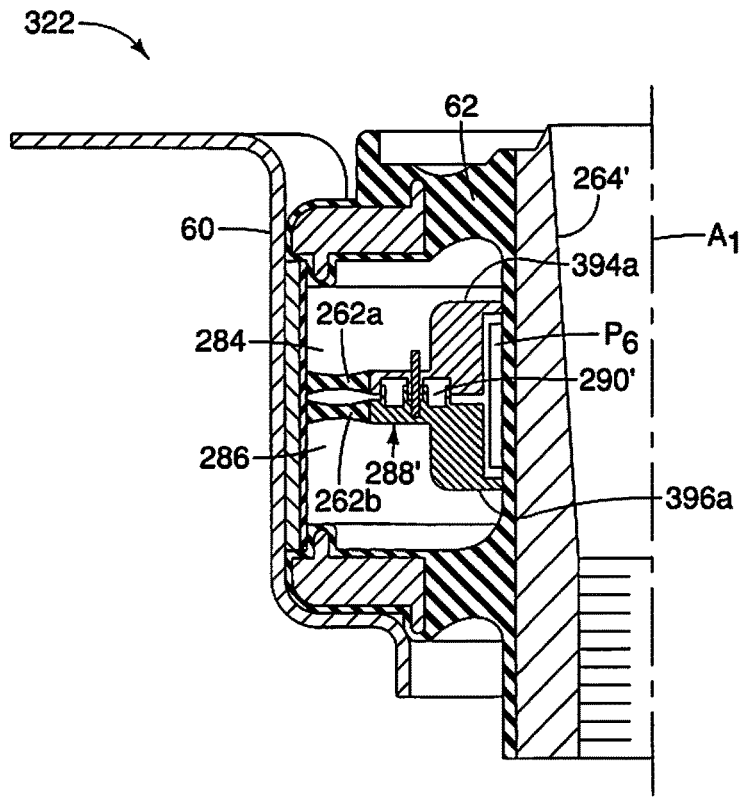
FIG. 21 is a cross-sectional view of a vibration dampening mounting assembly showing details of a hydraulic damper portion that includes a housing, a sleeve portion and a resilient portion that defines an upper fluid chamber and a lower fluid chamber, with a restricting structure disposed between the upper and lower fluid chambers with the hydraulic damper portion and the restricting structure in an at rest orientation in accordance with a fourth embodiment.
Figure 22:
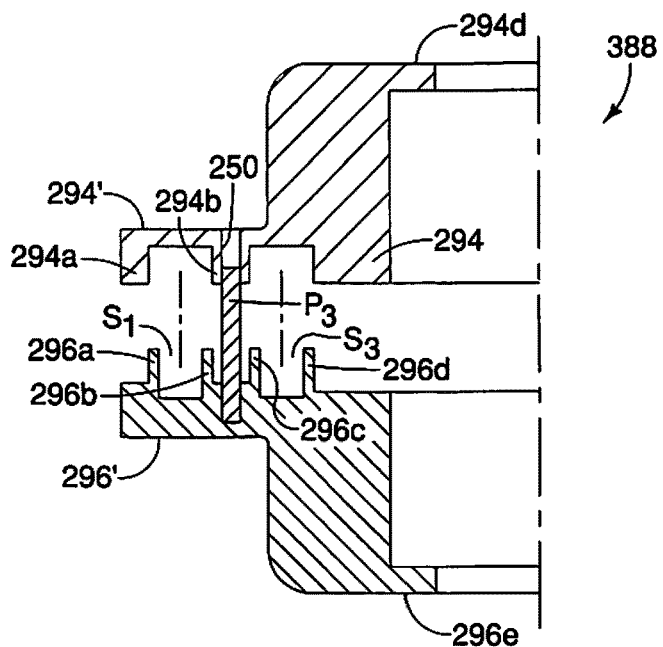
FIG. 22 is a cross-sectional view of a portion of the restricting structure shown removed from the hydraulic damper portion depicted in FIG. 21, showing details of portions of the restricting structure having spaces between respective protrusions that define a passageway that provides fluid communication between the upper fluid chamber and the lower fluid chamber in accordance with the fourth embodiment.

Referring now to FIGS. 21 and 22, a vibration dampening mount assembly 322 in accordance with a fourth embodiment will now be explained. In view of the similarity between the first, third and fourth embodiments, the parts of the fourth embodiment that are identical to the parts of the first and/or third embodiments will be given the same reference numerals as the parts of the first and/or third embodiment. Moreover, the descriptions of the parts of the fourth embodiment that are identical to the parts of the first and/or third embodiments may be omitted for the sake of brevity. The parts of the fourth embodiment that differ from the parts of the first and/or third embodiment will be indicated with a single prime (').

FIG. 21 is a cross-sectional view of the vibration dampening mounting assembly 322 showing details of the housing 60 and the resilient portion 62 as described above with respect to the first embodiment and the third embodiment, and further includes a sleeve portion 264'. The resilient portion 62 and the sleeve portion 264' define the first fluid chamber 284 and the second fluid chamber 286 as in the third embodiment, with a restricting structure 288' disposed between the upper and lower fluid chambers 284 and 286. FIG. 21 shows the vibration dampening mounting assembly 322 in an at rest orientation.

The restricting structure 288' is shown in a cross-sectional view in FIG. 22. Specifically, the restricting structure 288' is shown removed from the vibration dampening mounting assembly 322 in FIG. 22.

The restricting structure 288' includes a first portion and a second portion with the first portion being defined by a first part 294' and a second part 296', described further below. As with the first embodiment, the sleeve portion 264' can undergo limited movement in the directions represented by the central axis $A_1$ relative to the housing 60 in response to vibrations.

As with the third embodiment, in the fourth embodiment the first and second portions 294' and 296' define a passageway 290' therebetween. As shown in FIG. 22, first part 294' includes the annular protrusions 294a, 294b and 294c that extend downward mainly in directions parallel to the central axis $A_1$. The opening 250 is defined in the annular protrusion 294b (moved relative to the third embodiment). The first part 294' also includes the first leg 294d that extends toward the sleeve portion 264'.

The first space $S_1$ is at least partially defined between the annular projections 294a and 294b and an upper end wall extending therebetween. A third space $S_3$ is at least partially defined between the annular projections 294b and 294c and an upper end wall extending therebetween.

An outer radial end of the first part 294' is elastically fixed to the housing 60 via a resilient attachment member 262a such that the first portion 294' can undergo limited vertical movement relative to the housing 60 and the central axis $A_1$, and can undergo movement relative to the sleeve portion 264'.

An outer radial end of the second part 296' is elastically fixed to the housing 60 via a resilient attachment member 262b such that the second part 296' can undergo limited vertical movement relative to the housing 60 and the central axis $A_1$, and can undergo movement relative to the sleeve portion 264'.

The second part 296' has an overall disk or annular shape and includes the annular projections 296a, 296b, 296c and 296d of the third embodiment that extend upward in directions parallel to the central axis $A_1$. The second part 296' also includes the second leg 296e that extends toward the sleeve portion 264'.

In the at rest orientation depicted in FIG. 21, the annular projections 296a and 296b extend between the annular projections 294a and 294b, and the annular projections 296c and 296d extend between the annular projections 294b and 294c (similar to the third embodiment). Thus, the annular projections 294a and 294b and the annular projections 296a and 296b define the first space $S_1$, and the annular projections 294b and 294c and the annular projections 296c and 296d define the third space $S_3$. The second part 296' also includes an aperture with the alignment pin $P_3$ fixedly retained therein. The alignment pin $P_3$ is non-movably fixed to the second part 296' for movement therewith. The alignment pin $P_3$ extends upward through the opening 250 in the first part 294', thereby maintaining the first part 294' and the second part 296' in alignment with one another during vibrational movements. It should be understood from the drawings and the description herein, that the restricting structure 288' can include several alignment pins $P_3$ in order to maintain alignment between the first part 294' and the second part 296'.

Although not shown in FIGS. 21 and 22, the first part 294' includes openings that are operably the same as the openings 112 and 114 of the first embodiment. Similarly, the second part 296' includes openings that are operably the same as the openings 132. Hence, description of the openings 112, 114 and 132 of the third embodiment will be omitted for the sake of brevity.

The first part 294' is attached to the housing 60 via the resilient elastic material portion 262a and the second part 296' is attached to the housing 60 via the resilient elastic material portion 262b. The first and second parts 294' and 296' are therefore able to undergo limited vertical movement relative to the central axis $A_1$ relative to the housing 60 and relative to the sleeve portion 264'.

The second portion of the restricting structure 288' is defined on the sleeve portion 264'. Specifically, the sleeve portion 264' includes a pin $P_6$ (or ring) is fixedly and non-movably attached to the sleeve portion 264', or formed therewith. The pin $P_6$ is located below but adjacent to the first leg 294d and extends downward to a point above but adjacent to the second leg 296e.

The restricting structure 288' operates in a manner that is essentially the same as the restricting structure 288 of the third embodiment. Therefore, further description of the restricting structure 288 is omitted for the sake of brevity.

Fifth Embodiment

Figure 23:
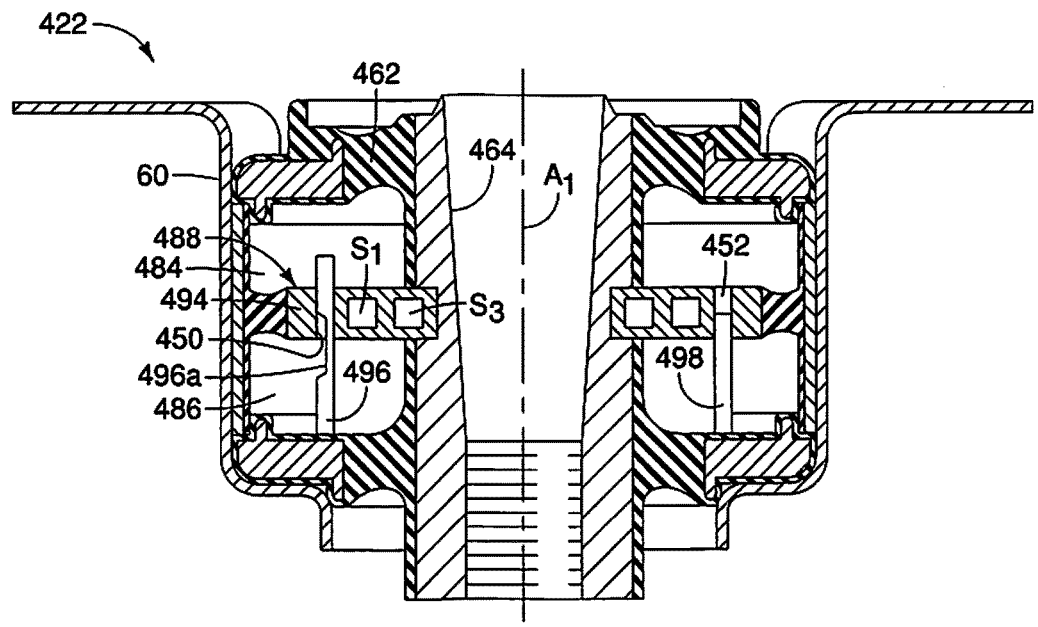
FIG. 23 is a cross-sectional view of a vibration dampening mounting assembly showing details of a hydraulic damper portion that includes a housing, a sleeve portion and a resilient portion that defines an upper fluid chamber and a lower fluid chamber, with a restricting structure disposed between the upper and lower fluid chambers with the hydraulic damper portion and the restricting structure in an at rest orientation in accordance with a fifth embodiment.
Figure 24:
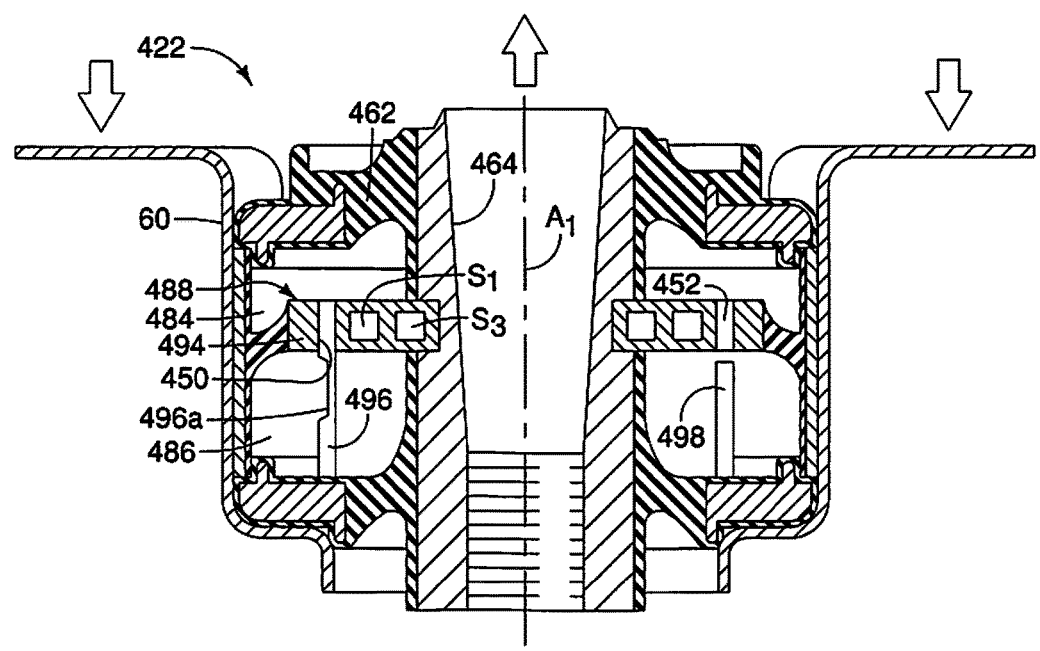
FIG. 24 is a cross-sectional view of the vibration dampening mounting assembly depicted in FIG. 23 showing the sleeve portion moved upward relative to the housing in response to vibrations with a first portion of the restricting structure moved upward relative to the housing and second portions of the restricting structure unmoved relative to the housing in a first displaced orientation such that a flow rate through the passageway is changes due to changes in the cross-sectional area of the spaces that define the passageway in accordance with the fifth embodiment.
Figure 25:
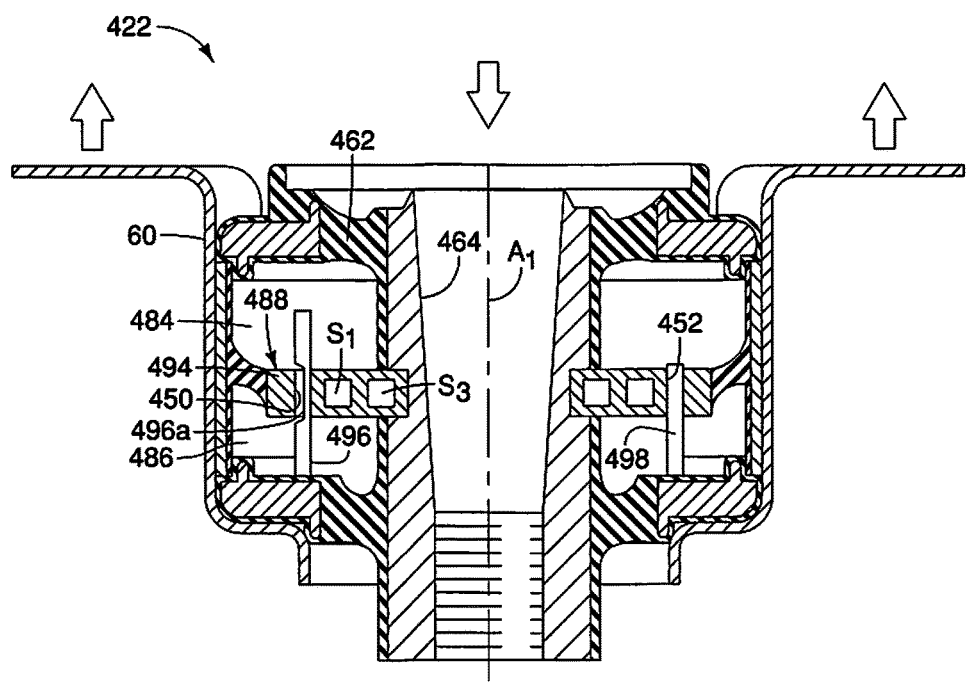
FIG. 25 is another cross-sectional view of the vibration dampening mounting assembly depicted in FIGS. 23 and 24, showing the sleeve portion moved downward relative to the housing in response to vibrations with a the first portion of the restricting structure moved downward relative to the housing and second portions of the restricting structure unmoved relative to the housing in a first displaced orientation such that a flow rate through the passageway is changed due to changes in the cross-sectional area of the spaces that define the passageway in accordance with the fifth embodiment.

Referring now to FIGS. 23-25, a vibration dampening mounting assembly 422 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

As shown in FIG. 23, the vibration dampening mounting assembly 422 includes the housing 60 as in the first embodiment, but further includes a sleeve portion 464 and a resilient portion 462 that defines a first fluid chamber 484 (an upper fluid chamber) and a second fluid chamber 486 (a lower fluid chamber), with a restricting structure 488 disposed between the first and second fluid chambers 484 and 486. FIG. 23 shows the vibration dampening mounting assembly 422 and the restricting structure 488 in an at rest orientation.

The restricting structure 488 includes a first portion (first pins 496 and second pins 498) and a second portion 494. The first portion includes the first pins 496 (only one fixed pin 496 is shown) and second pins 498 (only one fixed pin 498 is shown). The first and second pins 496 and 498 are non-movably fixed to the housing 60. The first pins 496 and the second pins 498 extend upward in directions parallel to the sleeve portion 464 and the central axis $A_1$. The first pin 496 includes a concaved portion 496a. The second pin 498 is cylindrically shaped, and is shorter than the first pin 496.

The second portion 494 of the restricting structure 488 is non-movably fixed to the sleeve portion 464 for movement therewith but is elastically connected to the housing 60 by an elastic material portion. The second portion 494 includes the spaces $S_1$ and $S_3$, however, the spaces $S_1$ and $S_3$ each have a fixed cross-sectional area thereby allowing a fixed maximum rate of fluid to flow therethrough. The second portion 494 defines a first opening 450 and a second opening 452 that at least partially define a variable rate fluid passageway. The first opening 450 and the second opening 452 both extend from the first chamber 484 to the second chamber 486. The first pin 496 extends into the first opening 450 and under certain circumstances the second pin 496 extends into the second opening 452.

In the at rest orientation shown in FIG. 23, the first pin 496 extends into the first opening 450 preventing fluid flow therethrough. Similarly, in the at rest orientation, the second pin 498 extends into the second opening 452 preventing fluid flow therethrough.

As shown in FIG. 24 with the sleeve portion 464 and the second portion 494 moved in a first direction (upward relative to the housing 60), the first pin 496 is still in a position that prevents fluid from flowing through the first opening 450. However, the second pin 498 is no longer in the opening 452, thereby allowing fluid to flow through the opening 452.

As shown in FIG. 25 with the sleeve portion 464 and the second portion 494 moved in a second direction (downward relative to the housing 60), the concaved portion 496a of the first pin 496 is positioned such that fluid can flow between the first chamber 484 and the second chamber 486 via the concaved portion 496a. However, the second pin 498 is within the opening 452, thereby preventing fluid from flowing through the opening 452.

Sixth Embodiment

Referring now to FIGS. 26-29, a vibration dampening mount assembly 522 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

Figure 26:
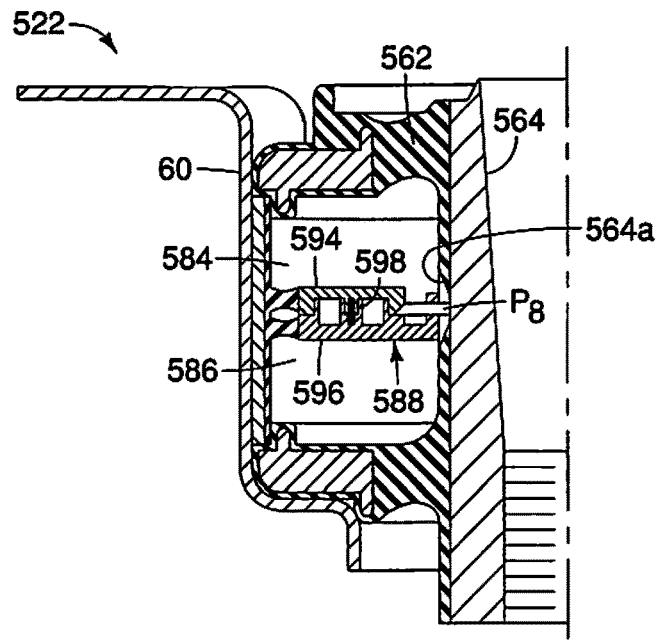
FIG. 26 is a cross-sectional view of a vibration dampening mounting assembly showing details of a hydraulic damper portion that includes a housing, a sleeve portion and a resilient portion that defines an upper fluid chamber and a lower fluid chamber, with a restricting structure disposed between the upper and lower fluid chambers with the hydraulic damper portion and the restricting structure in an at rest orientation in accordance with a sixth embodiment.

As shown in FIG. 26, the vibration dampening mount assembly 522 includes the housing 60 as described in the first embodiment, a resilient material section 562, a sleeve 564 and a restricting structure 588.

The resilient material section 562 is basically the same as the resilient material section 62 of the first embodiment in that it defines a first fluid chamber 584 and a second fluid chamber 586 with the restricting structure 588 located therebetween.

The restricting structure 588 includes a first portion and a second portion. The first portion of the restricting structure 588 is defined by a first part 594, a second part 596, a biasing member 598 (spring) and a third part $P_8$. The second portion is defined by a cam surface 564a formed on the sleeve 564. The cam surface 564a is a concaved area of the sleeve 564. More specifically, the sleeve 564 has an overall diameter that is greater than a diameter defined by the cam surface 564a (the concaved area). The cam surface 564a and the third part $P_8$ define a cam structure of the restricting structure 588.

The first part 594 and the second part 596 of the first portion of the restricting structure 588 are independently connected to the housing 60 via respective resilient members such that the first part 594 and the second part 596 can each undergo independent limited movement relative to the housing 60.

Figure 27:
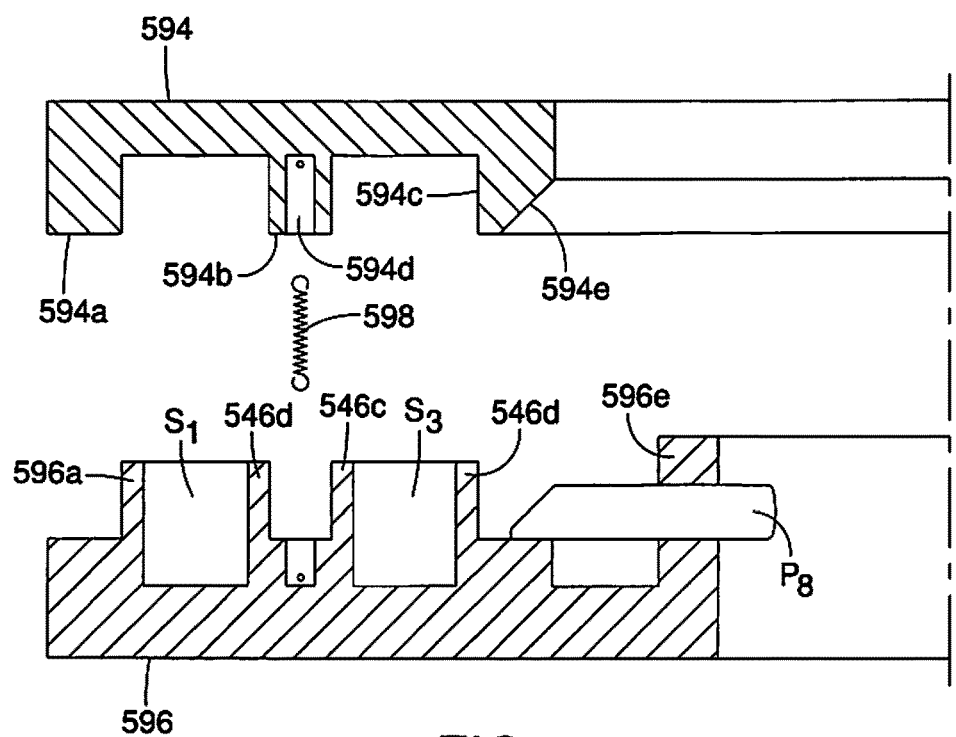
FIG. 27 is a cross-sectional view of a portion of the restricting structure shown removed from the hydraulic damper portion depicted in FIG. 26, showing details of portions of the restricting structure having spaces between therebetween that define a passageway that provides fluid communication between the upper fluid chamber and the lower fluid chamber in accordance with the sixth embodiment.

As shown in FIG. 27, the first part 594 includes a first annular projection 594a, a second annular projection 594b and a third annular projection 594c. The second annular projection 594b includes openings 594d (only one opening 594d is shown) that receives an upper end of the biasing member 598. It should be understood from the drawings and the description herein that the first part 94 can include a plurality of openings 594d that receive corresponding ones of the biasing members 598 as needed or desired. The third annular projection 594c includes a cam surface 594e.

The second part 596 includes a first annular projection 596a, a second annular projection 596b, a third annular projection 596c and a fourth annular projection 596d. As with the embodiments described above, the first annular projection 596a and the second annular projection 596b are inserted between the first annular projection 594a and the second annular projection 594b of the first part 594, thereby defining the first space $S_1$. Further, the third annular projection 596c and the fourth annular projection 596d are inserted between the second annular projection 594b and the third annular projection 594c of the first part 594, thereby defining the second space $S_2$. As with the first embodiment, the first space $S_1$ and the second space $S_2$ have cross-sectional areas that vary in response to relative movement between the first part 594 and the second part 596.

The second annular projection 594b of the first part 594 includes openings 594d (only one opening 594d is shown) that receives an upper end of the biasing member 598. It should be understood from the drawings and the description herein that the first part 94 can include a plurality of openings 594d that receive corresponding ones of a plurality of the biasing members 598 as needed or desired.

The second part 596 also includes a cam supporting portion 596e with an aperture that receives the third part $P_8$ of the first portion of the restricting structure 588. The third part $P_8$ includes a cam surface configured to engage the cam surface 594e of the first part 594 and a distal end (opposite the cam surface end of the third part $P_8$) that contacts the cam surface 564a formed on the sleeve 564.

As mentioned above, the second portion of the restricting structure 588 is defined by the cam surface 564a formed on the sleeve 564. The cam surface 564a is positioned to contact and move the third part $P_8$ in directions perpendicular to the central axis A1 of the vibration dampening mount assembly 522. The cam surface 564a defines a first cam surface that is centered within the cam surface 564a and is spaced apart from a radially outer surface of the sleeve 564. The cam surface 564a also includes upper and lower cam surface portions that extend radially outward from the central portion of the cam surface 564a, to the radially outer surface of the sleeve 564. Consequently, in response to relative movement of the sleeve 564 relative to the housing 60, the third part $P_8$ cam be urged to move back and forth in a direction perpendicular to the sleeve 564.

Figure 28:
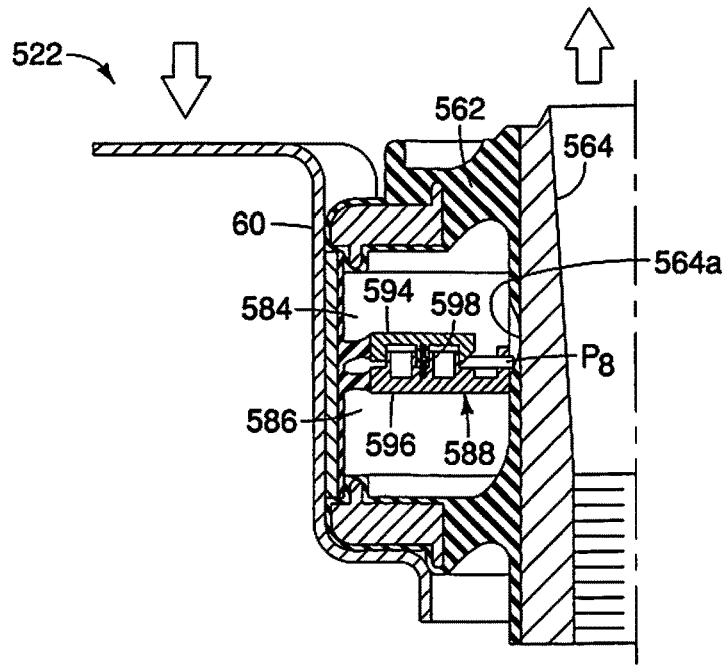
FIG. 28 is a cross-sectional view of the vibration dampening mounting assembly depicted in FIG. 26 showing the sleeve portion moved upward relative to the housing in response to vibrations with a portion of the restricting structure moved upward relative to the housing and a remainder of the restricting structure in a first displaced orientation such that a flow rate through the passageway is increased due to reduction in the cross-sectional area of the spaces that define the passageway in accordance with the sixth embodiment.
Figure 29:
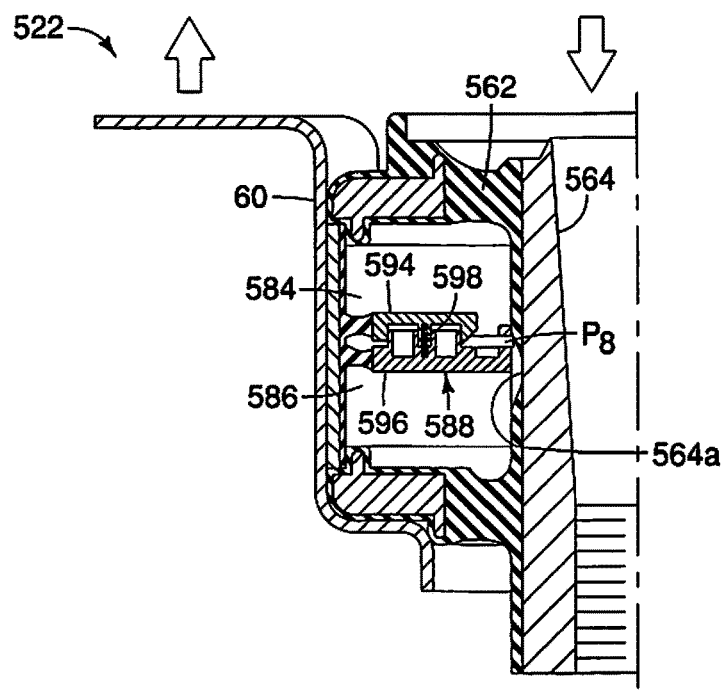
FIG. 29 is another cross-sectional view of the vibration dampening mounting assembly depicted in FIGS. 26 and 28, showing the sleeve portion moved downward relative to the housing in response to vibrations with the remainder of the restricting structure moved downward relative to the housing and the portion of the restricting structure in a second displaced orientation such that a flow rate through the passageway is increased due to reduction in the cross-sectional area of the spaces that define the passageway in accordance with the sixth embodiment.

As shown in FIG. 26, the third part $P_8$ is in an at rest orientation engaged with a central portion of the cam surface 564a. In this orientation, the first part 594 and the second part 596 are drawn toward one another by the biasing force of the biasing members 598. Further, in this orientation, the cross-sectional areas of the spaces $S_1$ and $S_3$ are at a minimum, reducing the flow rate through the passageway defined by the spaces $S_1$ and $S_3$, thereby restricting flow of fluid between the first chamber 584 and the second chamber 586. In the at rest orientation shown in FIG. 26, the distal end of the third part $P_8$ (a portion of the cam structure) is located within the concave area that defines the cam surface 564a such that the third part $P_8$ applies no force on the first part 594. As shown in FIGS. 28 and 29, in response to movement of the sleeve 564 in either a first direction (upward) or a second direction (downward) relative to the housing, the distal end of the third part $P_8$ (part of the cam structure) moves in a radial outward contacting the cam surface 594e of the first part 594 and moving the first part 594 away from the second part 596, thereby causing an increase in the cross-sectional areas of the spaces $S_1$ and $S_3$ resulting in an increase in the flow rate through the passageway defined by the spaces $S_1$ and $S_3$, thereby increasing flow of fluid between the first chamber 584 and the second chamber 586.

Seventh Embodiment

Figure 30:
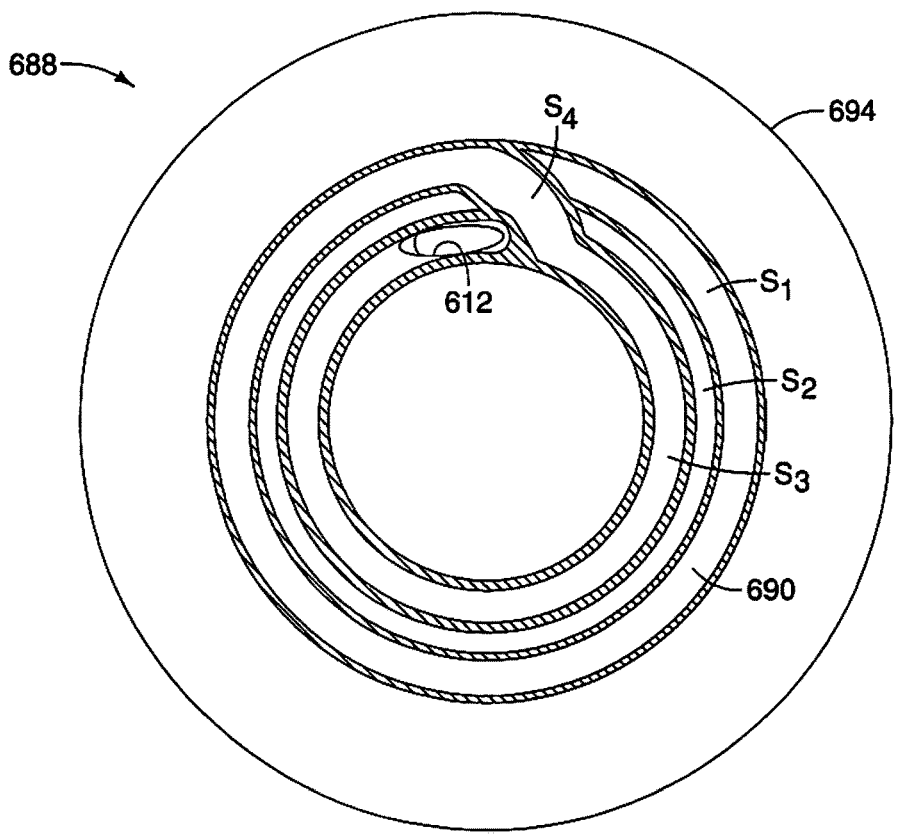
FIG. 30 is a plan view of a lower surface of a first portion of a restricting structure shown removed from a hydraulic damper portion showing a plurality of projections with spaces of a passageway defined therebetween in accordance with a seventh embodiment.
Figure 31:
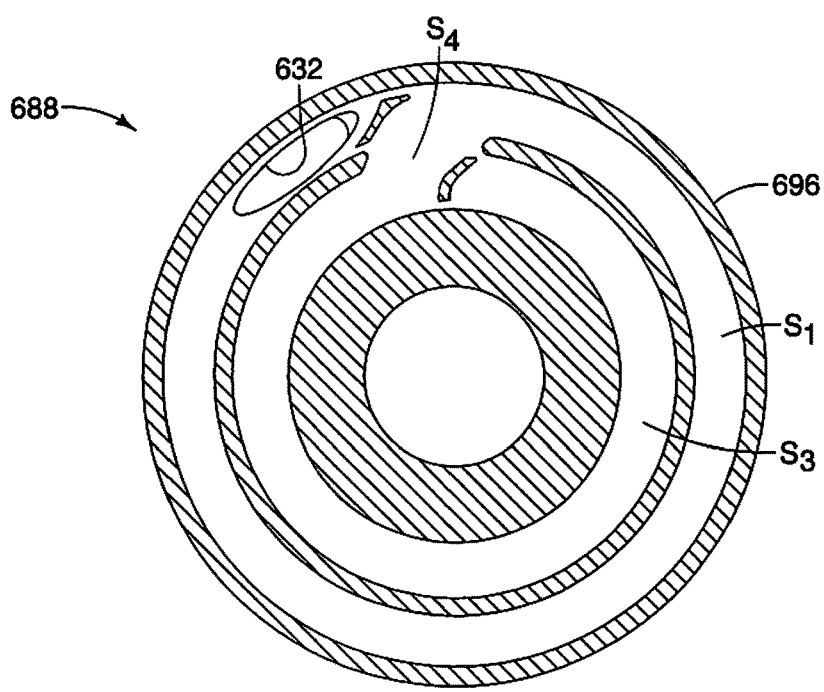
FIG. 31 is a plan view of an upper surface of a second portion of the restricting structure shown removed from the hydraulic damper portion showing a plurality of projections with spaces of the passageway defined therebetween in accordance with the seventh embodiment.

Referring now to FIGS. 30 and 31, a restricting structure 688 of a vibration dampening mount assembly in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

As shown in FIG. 30, the restricting structure 688 includes a first portion 694 and a second portion 696 that mate with one another in a manner similar to the restricting structures 88, 188, 288, 388, 488 and 588 described above. Specifically, various projections are formed on the first portion 694 at least partially defining the first space $S_1$, the second space $S_2$ and the third space $S_3$. Additionally, a fourth space $S_4$ is defined extending between the space $S_1$ and the space $S_3$.

Similarly, the second portion 696 includes a plurality of projections mate with the projections of the first portion 694 at least partially defining the first space $S_1$ and the third space $S_3$. Additionally, projections of the second portion 696 at least partially define the fourth space $S_4$ extending between the space $S_1$ and the space $S_3$. When mated together, the first portion 694 and the second portion 696 defines a passageway 690. The passageway 690 extends from a first opening 612 in the first portion 694, spirals around the third space $S_3$, through the fourth space $S_4$ and to the first space $S_1$ and finally to the second opening 632. Hence, the passageway 690 has an overall spiral shape.

It should be understood from the drawings and the description herein, that each of the restricting portions 88, 188, 288, 388, 488 and 588 of the above first through sixth embodiments can be modified to include the overall spiral shaped passageway 690 of the seventh embodiment.

The various vehicle elements and structure shown in the drawings (other than the vibration dampening mount assemblies described above) are conventional components that are well known in the art. Since vehicle elements and structures are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vibration dampening mount assembly. Accordingly, these terms, as utilized to describe the present invention should be interpreted relative to a vehicle equipped with the vibration dampening mount assembly.

The term "configured" as used herein to describe a component, section or part of a device includes hardware that is constructed and configured to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vibration dampening mount assembly comprising:
   a housing having interior surface, a first end and a second end;
   a resilient material having an outer portion fixedly attached to the interior surface of the housing and at least partially defining a first chamber and a second chamber within the housing;
   a sleeve disposed within the housing and being fixedly attached to a central portion of the resilient material, the sleeve extending from proximate the first end to the second end of the housing; and
   a restricting structure disposed between the first chamber and the second chamber within the housing, with a first portion of the restricting structure being attached to the housing and a second portion of the restricting structure being attached to the sleeve such that in response to movement of the sleeve rotative to the housing, the second portion of the restricting structure moves relative to the first portion, the first portion and the second portion of the restricting structure defining a fluid passageway therebetween, the fluid passageway providing fluid communication between the first and second chambers, the cross-sectional area of the fluid passageway changing in response to movement of the second portion relative to the first portion.

2. The vibration dampening mount assembly of claim 1, wherein
   the first portion is non-movably fixed to the housing for movement therewith and includes a pair of first wall sections with a first space being defined therebetween, and
   the second portion is non-movably fixed to the sleeve for movement therewith, the second portion defining a pair of second wall sections with a second space being defined therebetween, the first wall sections extending into the second space such that the first space and the second space define the fluid passageway.

3. The vibration dampening mount assembly of claim 2, wherein
   each of the pair of first wall portions defines a first outer surface and a first inner surface, with the first inner surfaces facing one another and having a first end surface extending therebetween,
   each of the pair of second wall portions defines a second outer surface and a second inner surface, with the second inner surfaces facing one another and having a second end surface extending therebetween,
   the first outer surfaces being disposed along sections of the second inner surfaces for sliding movement relative thereto, and the first inner surfaces and the first end surface, the second inner surfaces and the second end surface surrounding a portion of the fluid passageway.

4. The vibration dampening mount assembly of claim 1, wherein
the second portion defines an inner radial end fixed to the sleeve and a second radial end that is fixed to the housing via a resilient attachment member such that the second portion is movable relative to the housing.

5. The vibration dampening mount assembly of claim 1, wherein
the first portion is non-movably fixed to the housing for movement therewith and defines the fluid passageway therein with a pair of first end walls spaced apart from one another defining an opening, the opening being open to the fluid passageway, and
the second portion is non-movably fixed to the sleeve for movement therewith, the second portion defining a second wall section with part of the second wall section extending between the first end walls and into the fluid passageway such that movement of the sleeve relative to the housing further moves the second wall section relative to the first end walls thereby changing an amount of the part of the second wall section extending into the fluid passageway.

6. The vibration dampening mount assembly of claim 5, wherein
the first portion defines an outer radial end fixed to the housing and a second radial end that is fixed to the sleeve via a resilient attachment member such that the sleeve is movable relative to the first portion and the housing.

7. The vibration dampening mount assembly of claim 1, wherein
the first portion includes a first part that is connected to the housing for movement therewith via a resilient member such that the first part can undergo limited movement relative to the housing, the first part having a first leg that extends to the sleeve,
the second portion includes as first cam-pin non-movably fixed to the sleeve for movement therewith such that with the sleeve in an at rest orientation relative to the housing, the first cam-pin is spaced apart from the first leg, and with the sleeve moved in a first direction relative to the housing the first cam-pin contacts the first leg of the first part causing movement of the first part relative to the housing.

8. The vibration dampening mount assembly of claim 7, wherein
the first portion includes a second part that is connected to the housing for movement therewith via a resilient member such that the second part can undergo limited movement relative to the housing and the first part, the second part having a second leg that extends to the sleeve,
the second portion includes a second cam-pin non-movably fixed to the sleeve for movement therewith such that with the sleeve in the at rest orientation relative to the housing, the second cam-pin is spaced apart from the second leg, and with the sleeve moved in a second direction relative to the housing opposite the first direction, the second cam-pin contacts the second leg of the second part causing movement of the second part relative to the housing.

9. The vibration dampening mount assembly of claim 8, wherein the first part of the first portion includes a pair of first wall sections with a first space being defined therebetween, and
the second part of the first portion defines a pair of second wall sections with a second space being defined therebetween, the second wall sections extending into the first space such that the first space and the second space define the fluid passageway.

10. The vibration dampening mount assembly of claim 9, wherein
each of the pair of first wall portions defines a first outer surface and a first inner surface, with the first inner surfaces facing one another and having a first end surface extending therebetween,
each of the pair of second wall portions defines a second outer surface and a second inner surface, with the second inner surfaces facing one another and having a second end surface extending therebetween,
the second outer surfaces being disposed along sections of the first inner surfaces for sliding movement relative thereto, and
the first inner surfaces, the first end surface, the second inner surfaces and the second end surface surrounding a portion of the fluid passageway.

11. The vibration dampening mount assembly of claim 10, wherein
one of the first part and the second part of the first portion of the restricting structure includes an alignment pin that slidably extends into an alignment aperture of the other of the first part and the second part, the alignment pin being configured to limit relative movement between the first part and the second part to linear movement in a direction parallel to the sleeve.

12. The vibration dampening mount assembly of claim 1, wherein
the first portion is non-movably fixed to the housing for movement therewith and includes a first pin that extends in a direction parallel to the sleeve, the first pin having a concaved portion,
the second portion is non-movably fixed to the sleeve for movement therewith, the second portion defining a first opening that at least partially defines the fluid passageway, the first opening extending from the first chamber to the second chamber, the first pin extending into the first opening with the sleeve in an at rest orientation relative to the housing such that the concaved portion is spaced apart from the first opening such that the first pin blocks flow of fluid between the first chamber and the second chamber through the first opening, and
with the sleeve moved in a first direction relative to the housing, the concaved portion is located within the first opening allowing fluid flow via the concaved portion between the first chamber and the second chamber, and
with the sleeve moved in a second direction opposite the first direction relative to the housing, the concaved portion is positioned to block the first opening preventing fluid flow via the concaved portion between the first chamber and the second chamber.

13. The vibration dampening mount assembly of claim 12, wherein
the first portion includes a second pin that extends in a direction parallel to the sleeve and the first pin,
the second portion defines a second opening that at least partially defines the fluid passageway, the second opening extending from the first chamber to the second chamber, the second pin extending into the second opening preventing fluid flow through the second opening with the sleeve in the at rest orientation relative to the housing, and with the sleeve moved in the first direction relative to the housing, the second pin blocks the second opening preventing fluid flow between the first chamber and the second chamber, and with the sleeve moved in the second direction, the second pin is spaced apart from the second opening allowing fluid flow between the first chamber and the second chamber.

14. The vibration dampening mount assembly of claim 1, wherein the first portion includes a first part, a second part and a third part, the first part being connected to the housing for movement therewith via a resilient member such, that the first part can undergo limited movement relative to the housing, the second part is connected to the housing for movement therewith via a resilient member such that the second part can undergo limited movement relative to the housing and the first part, the third part of the first portion includes a cam structure, the second portion includes concave area that defines a first cam surface and a second cam surface formed on a radial outer surface of the sleeve, the cam structure being configured such that with the sleeve in an at rest orientation relative to the housing, a portion of the cam structure is located within the concave area applying no force on the first part and the second part, with the sleeve moved in a first direction relative to the housing the cam structure contacts the first cam surface and is moved between the first part and the second part moving them away from one another, and with the sleeve moved in a second direction opposite the first direction relative to the housing the cam structure contacts the second cam surface and is moved between the first part and the second part moving them away from one another.

15. The vibration dampening mount assembly of claim 14, wherein the first part of the first portion includes a pair of first wall sections with a first space being defined therebetween, and the second part of the first portion defines a pair of second wall sections with a second space being defined therebetween, the second wall sections extending into the first space such that the first space and the second space define the fluid passageway.

16. The vibration dampening mount assembly of claim 15, wherein each the pair of first wall portions defines a first outer surface and a first inner surface, with the first inner surfaces facing one another and having a first end surface extending therebetween, each of the pair of second wall portions defines a second outer surface and a second inner surface, with the second inner surfaces facing one another and having a second end surface extending therebetween, the second outer surfaces being disposed along sections of the first inner surfaces for sliding movement relative thereto, and the first inner surfaces, the first end surface, the second inner surfaces and the second end surface surrounding a portion of the fluid passageway.

17. The vibration dampening mount assembly of claim 1, wherein the sleeve defines a central aperture that extends from proximate the first end of the housing to the second end of the housing with the first chamber and the second chamber being concentric about a central axis defined by the central aperture.

18. The vibration dampening mount assembly of claim 17, wherein the central aperture is dimensioned to receive an elongated fastener configured to fix the central portion of the resilient material to a first portion a vehicle, and the housing includes an attachment portion that is configured to attach to a second portion of the vehicle.

19. The vibration dampening mount assembly of claim 18, wherein the first portion of the vehicle is a frame and the second portion of the vehicle is a cabin structure installed to the frame.

* * * * *